(12) United States Patent
Galati et al.

(10) Patent No.: US 8,328,549 B2
(45) Date of Patent: Dec. 11, 2012

(54) HEATING APPARATUS FOR FLUID FLOW CHANNEL

(75) Inventors: Vito Galati, Rowley, MA (US); Michael Lewis Vasapoli, Gloucester, MA (US); Mark Robert Young, Groveland, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 90 days.

(21) Appl. No.: 12/980,979

(22) Filed: Dec. 29, 2010

(65) Prior Publication Data

US 2011/0159139 A1 Jun. 30, 2011

Related U.S. Application Data

(60) Provisional application No. 61/406,351, filed on Oct. 25, 2010, provisional application No. 61/323,527, filed on Apr. 13, 2010, provisional application No. 61/290,582, filed on Dec. 29, 2009.

(51) Int. Cl.
*B29C 45/20* (2006.01)
(52) U.S. Cl. .................................. 425/549; 264/328.15
(58) Field of Classification Search .................. 425/549, 425/562, 563, 564, 565, 566, 572; 264/328.15
See application file for complete search history.

(56) References Cited

U.S. PATENT DOCUMENTS

| 5,798,504 | A  | * | 8/1998 | Schwarzkopf | 219/550 |
| 6,780,003 | B2 | * | 8/2004 | Sicilia et al. | 425/549 |
| 6,869,276 | B2 | * | 3/2005 | Babin et al. | 425/549 |
| 7,396,226 | B2 | * | 7/2008 | Fairy | 425/549 |
| 2005/0181090 | A1 | * | 8/2005 | Olaru | 425/549 |
| 2007/0221659 | A1 |   | 9/2007 | Liebram et al. | |

FOREIGN PATENT DOCUMENTS

| CA | 2176088 A1 | 12/1996 |
| DE | 296 10 136 U1 | 9/1995 |
| WO | WO 2005/079115 A1 | 8/2005 |

OTHER PUBLICATIONS

International Search report and Written Opinion dated Apr. 15, 2011 in corresponding PCT/US2010/062370.

* cited by examiner

*Primary Examiner* — Tim Heitbrink
(74) *Attorney, Agent, or Firm* — Rissman Hendricks & Oliverio LLP

(57) ABSTRACT

Apparatus for heating a fluid being injected in an injection molding system, the apparatus comprising a mold having a cavity, a fluid flow distribution manifold, a fluid flow channel body, a coiled heater tube comprised of a thermally conductive wall, a heater device disposed within the coiled tube; the coiled tube having an upstream, downstream and intermediate coiled portions, the upstream and downstream coiled portions of the coiled tube being selectively movable away from each other along the coil axis to cause the intermediate coiled portion of the coiled tube to stretch or extend in coil axial length.

17 Claims, 30 Drawing Sheets

HEATING APPARATUS FOR FLUID FLOW CHANNEL

RELATED APPLICATIONS

This application claims the benefit of priority to U.S. Provisional Application Ser. No. 61/290,582 filed Dec. 29, 2009 and to U.S. Provisional Application Ser. No. 61/323,527 filed Apr. 13, 2010 and to U.S. Provisional Application Ser. No. 61/406,351 filed Oct. 25, 2010, the disclosures of all of the foregoing of which are incorporated by reference herein in their entirety as if fully set forth herein.

BACKGROUND

In injection molding systems there are numerous fluid flow passages that require heating in order to effectively maintain the system in proper operating condition such that fluid does not freeze within the flow channels and/or flows at desired rates at desired times. There is a need for heater mechanisms that can be mounted on or around such flow channels in thermally conductive communication with the interior of the flow channel quickly and efficiently.

SUMMARY

In accordance with the invention there is provided an apparatus for heating a fluid being injected in an injection molding system, the apparatus comprising:

a mold having a cavity, a fluid flow distribution manifold, a fluid flow channel body surrounding a fluid flow channel having a flow path axis, the fluid flow channel communicating with the cavity of the mold to deliver fluid thereto;

a coiled tube comprised of a thermally conductive wall, the wall formed into an elongated coil having a coil axis, the wall of the coiled tube housing a hollow interior bore extending from an upstream end to a downstream end of the coiled tube;

a heater disposed within the hollow interior bore in thermally conductive communication with an interior surface of the wall, the heater being controllably heatable to selectable elevated temperatures;

the coiled tube being mounted in thermally conductive communication with the fluid flow channel body around the fluid flow axis of the flow channel;

the coiled tube having an upstream coiled portion, a downstream coiled portion and an intermediate coiled portion connecting the upstream and downstream coiled portions;

the upstream and downstream coiled portions of the coiled tube being selectively movable away from each other along the coil axis over a selected range of axial distance to cause the intermediate coiled portion of the coiled tube to stretch or extend in coil axial length on axial movement of the upstream and downstream coiled portions away from each other over the selected range of axial distance.

The upstream and downstream coiled portions of the coiled tube are preferably adapted to resist stretching on being separated over the selected range of axial distance. The upstream and downstream coiled portions are preferably readily attachable to and detachable from a surface of the fluid flow channel body surrounding the fluid flow subsequent to the intermediate coiled portion being extended, the intermediate coiled portion being slidably mounted around the surface surrounding the axis of the fluid flow channel and in thermally conductive communication therewith.

The upstream and downstream coiled portions are typically attached to upstream and downstream tubular collars respectively, the tubular collars being readily attachable to and detachable from upstream and downstream portions of the fluid flow channel body or a thermally conductive body in contact therewith such that the upstream and downstream coiled portions are fixed in thermally conductive communication with the fluid flow channel body.

The upstream and downstream coiled portions are preferably mountable around the fluid flow channel axis such that the upstream and downstream coiled portions are rotatable relative to each other around the fluid flow channel axis.

The tubular collars are preferably rotatable relative to each other to a selected degree around the fluid flow channel axis in a direction that causes the intermediate coiled portion to increase or decrease in cross-sectional diameter to a selected degree that is dependent on the selected degree of rotation of the tubular collars. The tubular collars are preferably rotated relative to each other around the fluid flow axis to such a degree as to cause the intermediate coiled portion to engage against the fluid flow channel body under compression when the tubular collars are attached to the fluid flow channel body. One or the other or both of the tubular collars typically comprise a highly thermally conductive cast material.

One or the other or both of the upstream and downstream coiled portions can be embedded within complementary grooves formed within one or the other or both of the upstream and downstream tubular collars.

One or the other or both of the upstream and downstream coiled portions can be welded or brazed to an exterior or interior radial surface of a respective one of the upstream and downstream tubular collars.

The intermediate coiled portion preferably contracts in cross-sectional diameter upon stretching or extension along its coil axis.

The upstream, downstream and intermediate coiled portions of the coiled tube can each have a selected initial state coil axial length and can have a selected number of coils per their respective initial state coil axial lengths prior to movement of the upstream and downstream coiled portions away from each other, the coil axial lengths of the upstream and downstream coiled portions remaining the same or substantially the same on movement away from each other and the intermediate coiled portion increasing in coil axial length and having fewer coils per coil axial length on movement of the upstream and downstream portions away from each other.

The upstream, downstream and intermediate coiled portions can each have a selected radial diameter prior to movement of the upstream and downstream coiled portions away from each other, the upstream and downstream portions having the same or substantially the same radial diameter and the intermediate coiled portion having a smaller radial diameter subsequent to movement of the upstream and downstream coiled portions away from each other.

One or the other or both of the upstream and downstream coiled portions can be connected to and arranged on a radially interior surface of a respective upstream or downstream tubular collar such that the wall of the upstream or downstream coiled portion is in direct contact with or immediate spatial adjacency to an outside surface of the fluid flow channel body or a thermally conductive body in contact with the fluid flow channel body when the tubular collars are attached to the fluid flow channel body or a thermally conductive body in contact therewith.

One or the other or both of the upstream and downstream coiled portions can be mounted and arranged on a respective upstream or downstream tubular collar such that a radially interior surface of the upstream or downstream tubular collar is in immediate contact with or adjacency to the surface surrounding the fluid flow channel. The upstream and downstream coiled portions of the coiled tube can be connected to the radially interior surfaces of their respective upstream and downstream tubular collars such that the distance between successive coils of the upstream and downstream portions of the coiled tube does not change on movement of the tubular collars axially away from each other along the coil axis of the coiled tube.

The upstream and downstream tubular collars are preferably moved away from each other along the coil axis of the coiled tube such that the coils of the intermediate coiled portion stretch axially away from each other and successive coils are separated from each other by a greater distance than they were separated before the intermediate coiled portion is stretched.

A selected one of the upstream or downstream tubular collars can be adapted to extend in axial length a selected distance such that the intermediate coiled portion is circumferentially surrounded along a selected portion of its coil axis by the selected one of the tubular collars.

The axial length of the selected one of the tubular collars is typically selected so that the selected one of the tubular collars surrounds the intermediate portion of the coiled tube along at least about 60% of the coil axis length of the intermediate coiled portion after the intermediate coiled portion has been stretched. The maximum axial distance to which the intermediate portion can be stretched can be at least about 30 inches. The maximum axial distance to which the intermediate portion can be stretched can be at least about 12 inches. The maximum axial distance to which the intermediate portion can be stretched is typically at least about 2 inches.

Preferably the number of coils per length of coil axis of the upstream, downstream and intermediate coiled portions of the coiled tube is selectively variable.

Typically, the degree of heat energy output of the upstream, downstream and intermediate coiled portions is dependent on the number of coils per coil axis length of each section. The number of such is preferably selectively variable.

Preferably one of the upstream or downstream coiled portions are readily fixedly attachable to (and detachable from) an outside surface of the fluid flow channel body and the other of the upstream or downstream coiled portions is slidable along the outside surface of the fluid flow channel body prior to movement of the upstream and downstream portions away from each other.

The intermediate coiled portion typically has a coil axis of selected intermediate coil axis length subsequent to movement of the upstream and downstream mounts away from each other, the apparatus further comprising an intermediate tubular collar disposed around the intermediate coiled portion of the coiled tube along a selected portion of the selected intermediate coil axis length.

The intermediate coiled portion typically has a coil axis of selected intermediate coil axis length subsequent to movement of the upstream and downstream mounts away from each other, the apparatus further comprising an intermediate tubular collar disposed around the intermediate coiled portion of the coiled tube along a selected portion of the selected intermediate coil axis length. The intermediate tubular collar preferably has an interior circumferential surface in compressed contact with an outside circumferential surface of the intermediate coiled portion of the coiled tube. The intermediate tubular collar can have an axis and a longitudinal opening extending from a top end to a bottom end of a wall of the intermediate collar, the wall of the intermediate collar having an inherent spring force such that the wall of the collar is reversibly expandable in cross-sectional diameter and separable along the opening on application of manual force opposing the spring force along the opening, the intermediate collar being slidable in a diameter expanded condition along its axis substantially coaxial with the coil axis over the outside circumferential surface of the coiled tube to a position in alignment with the intermediate coil axis, the spring force inherent in the wall of the intermediate collar returning the wall of the intermediate collar to a relaxed state wherein the inside circumferential surface of the collar is in compressed contact with the outside circumferential surface of the coiled tube under at least in part the spring force inherent in the wall of the intermediate collar.

The intermediate tubular collar can have an axis and a longitudinal opening extending from a top end to a bottom end of a wall of the intermediate collar, the wall of the collar including a lock that is reversibly manually lockable and unlockable to connect the wall along the longitudinal opening. The lock can comprise a tongue projecting radially from the wall at a position along the opening and a complementary receiving aperture disposed within the wall at a position opposite the tongue along the opening, the tongue having an inherent spring force and being disposed on the wall in axial alignment with the receiving aperture such that the tongue is receivable within the aperture, the spring force in the tongue maintaining the tongue within the aperture and concomitantly preventing the walls of the intermediate collar from separating along the opening.

The coiled tube typically has a longitudinal axis, the heater being selectively variable in degree of heat output per unit of length along the longitudinal axis of the heater tube at or along any one or more selected positions along the longitudinal axis of the coiled tube.

The heater can have a first preselected degree of heat output per unit of length along the longitudinal length of the heater tube disposed within the upstream coiled portion, a second preselected degree of heat output per unit of length along the longitudinal length of the heater tube disposed within the downstream coiled portion and a third preselected degree of heat output per unit of length along the longitudinal length of the heater tube disposed within the intermediate coiled portion.

The heater can comprise a wire heatable to selectively variable elevated temperatures along the longitudinal length of the heater tube, the wire having a first selected number of coils per unit of length of the longitudinal length of the heater tube disposed within the upstream coiled portion, a second selected number of coils per unit of length of the longitudinal length of the heater tube disposed within the downstream coiled portion and a third selected number of coils per unit of length of the longitudinal length of the heater tube disposed within the intermediate coiled portion.

One of the upstream coiled portion and the downstream coiled portion of the heater tube are typically mounted around an end of the flow channel body that is in immediate thermal contact with a heated body, the one coiled portion in such contact having a preselected lesser degree of heat output than the degree of heat output of the other coiled portion.

One of the upstream coiled portion and the downstream coiled portion of the heater tube can be mounted around an end of the flow channel body that is in thermal contact with a heated body, the one coiled portion in such contact having a preselected lesser degree of heat output per unit of length along the longitudinal length of the heater tube disposed within the one coiled portion than the degree of heat output per unit of length along the longitudinal length of the heater tube disposed within the other coiled portion.

At least one of the tubular collars can be fixable to the fluid flow channel body via a screw.

The upstream and downstream coiled portions are preferably rotatable relative to each other to a selected degree around the fluid flow channel axis in a direction that causes the intermediate coiled portion to increase or decrease in cross-sectional diameter to a selected degree that is dependent on the selected degree of rotation of the upstream and downstream portions.

The upstream and downstream portions are typically rotated relative to each other around the fluid flow axis to such a degree as to cause the intermediate coiled portion to engage against the fluid flow channel body under compression when the upstream and downstream portions are attached to the fluid flow channel body.

The fluid flow channel body can comprises a nozzle interconnecting an upstream flow channel of a distribution manifold to a downstream gate of a mold. The fluid flow channel body can comprise a tube interconnecting an upstream fluid output from an injection molding machine to a downstream fluid input channel of a fluid distribution manifold.

In another aspect of the invention there is provided, an apparatus for heating a fluid in an injection molding system, the apparatus comprising:

a fluid flow channel body having a fluid flow channel communicating fluid flow to a cavity of a mold;

a coiled tube comprised of a thermally conductive wall, the wall formed into an elongated coil having a coil axis, the wall of the coiled tube housing a hollow interior bore extending from an upstream end to a downstream end of the coiled tube;

a heater disposed within the hollow interior bore in thermally conductive communication with an interior surface of the wall of the coiled tube, the heater being controllably heatable to selectable elevated temperatures;

the coiled tube being mounted in thermally conductive communication with the fluid flow channel body around an axis of the fluid flow channel;

the coiled tube having an upstream coiled portion, a downstream coiled portion and an intermediate coiled portion connecting the upstream and downstream coiled portions;

one or the other or both of the upstream and downstream coiled portions being mounted on a respective one of an upstream and downstream tubular collar that surrounds and is in thermally conductive communication with an outside surface of the fluid flow channel;

the upstream and downstream coiled portions of the coiled tube being selectively movable away from each other along the coil axis over a selected range of axial distance such that the intermediate coiled portion extends in axial length on movement of the upstream and downstream coiled portions away from each other.

In another aspect of the invention there is provided, an apparatus for heating a fluid material in an injection molding system, the apparatus comprising:

a fluid flow channel body having a flow channel that communicates fluid flow to a cavity of a mold mounted in the injection molding system;

a coiled tube comprised of a thermally conductive wall, the wall formed into an elongated coil having a coil axis, the wall of the coiled tube housing a hollow interior bore extending from an upstream end to a downstream end of the coiled tube;

a heater disposed in the hollow interior bore in thermally conductive communication with an interior surface of the wall, the heater being controllably heatable to selectable elevated temperatures;

the coiled tube being mounted in thermally conductive communication with fluid flow channel body around the fluid flow channel;

the coiled tube having an upstream coiled portion, a downstream coiled portion and an intermediate coiled portion connecting the upstream and downstream coiled portions;

the upstream and downstream coiled portions of the coiled tube being selectively movable away from each other over a selected range of axial distance along the coil axis;

wherein the upstream, downstream and intermediate coiled portions of the coiled tube each have a selected coil axial length and have a selected number of coils per their respective coil axial lengths, the upstream and downstream coiled portions of the coiled tube being selectively movable away from each other along the coil axis to cause the number of coils per coil axial length of the intermediate coiled portion to be reduced upon movement of the upstream and downstream coiled portions away from each other.

In another aspect of the invention there is provided, an apparatus for heating a fluid material in an injection molding system, the apparatus comprising:

a fluid flow channel body having a flow channel communicating fluid flow to a cavity of a mold;

a coiled tube comprised of a thermally conductive wall, the wall formed into an elongated coil having a coil axis, the wall of the coiled tube housing a hollow interior bore extending from an upstream end to a downstream end of the coiled tube;

a heater disposed in the hollow interior passage in thermally conductive communication with an interior surface of the wall, the heater being controllably heatable to selectable elevated temperatures;

the coiled tube being mounted in thermally conductive communication with the fluid flow channel body;

the coiled tube having an upstream coiled portion, a downstream coiled portion and an intermediate coiled portion connecting the upstream and downstream coiled portions;

the upstream and downstream coiled portions of the coiled tube being selectively movably away from each other along the coil axis over a selected range of axial distance;

wherein the upstream, downstream and intermediate coiled portions each have a selected radial diameter prior to movement of the upstream and downstream coiled portions away from each other, the upstream and downstream coiled portions having the same or substantially the same radial diameter and the intermediate coiled portion having a smaller radial diameter subsequent to movement of the upstream and downstream coiled portions away from each other over the selected axial distance.

In another aspect of the invention there is provided in an injection molding system, a method of heating a fluid flow channel body that defines a fluid flow channel that communicates fluid flow to a mold of a cavity mounted in the system, the fluid flow channel having an axis, the method comprising:

forming a hollow tube having a thermally conductive wall that surrounds and forms a hollow interior bore housed by the wall of the tube;

forming the hollow tube into a coil configuration having a coil axis and disposing a heating device within the bore of the hollow tube;

mounting the coiled tube around an outside surface of the fluid flow channel body in thermally conductive communication with the fluid flow body;

moving an upstream coiled portion of the coiled tube axially away from a downstream coiled portion of the coiled tube a selected distance along the coil axis, the upstream and downstream coiled portions being interconnected by an intermediate coiled portion of the tube, the intermediate coiled portion extending in coil axial length on movement of the upstream and downstream coiled portions away from each other;

controllably heating the heating device to a selected temperature.

The method preferably further comprises mounting the upstream coiled portion and the downstream coiled portion to upstream and downstream tubular collars and attaching the upstream and downstream coiled portions to fluid flow channel body subsequent to the step of moving.

In such a method, the intermediate coiled portion typically has a first cross-sectional diameter prior to the intermediate coiled portion being extended, the method preferably further comprising rotating the upstream coiled portion and the downstream coiled portion relative to each other around the fluid flow channel axis to a degree and in a direction selected to reduce the first diameter to a second smaller diameter wherein the inside circumferential surface of the intermediate coiled section engages against the fluid flow channel under pressure.

In such a method, the step of forming the hollow tube into a coil configuration preferably further comprises forming the upstream, downstream and intermediate coiled portions to have a selected number of coils per unit of length along the coil axis extending along said portions, the step of moving comprising maintaining the selected the number of coils constant per unit of length of the coil axis along the upstream and downstream coiled portions during performance of the step of moving and reducing the number of coils per unit of length of the coil axis along the intermediate coiled portion during the step of moving.

In such a method the step of forming the hollow tube into a coil configuration preferably further comprises forming the upstream, downstream and intermediate coiled portions to each have a selected cross-sectional diameter, the step of moving comprising maintaining the selected cross-sectional diameter of the upstream and downstream coiled portions substantially constant during the step of moving and reducing the cross-sectional diameter of the intermediate coiled portion during the step of moving.

DETAILED DESCRIPTION

Figure 1:
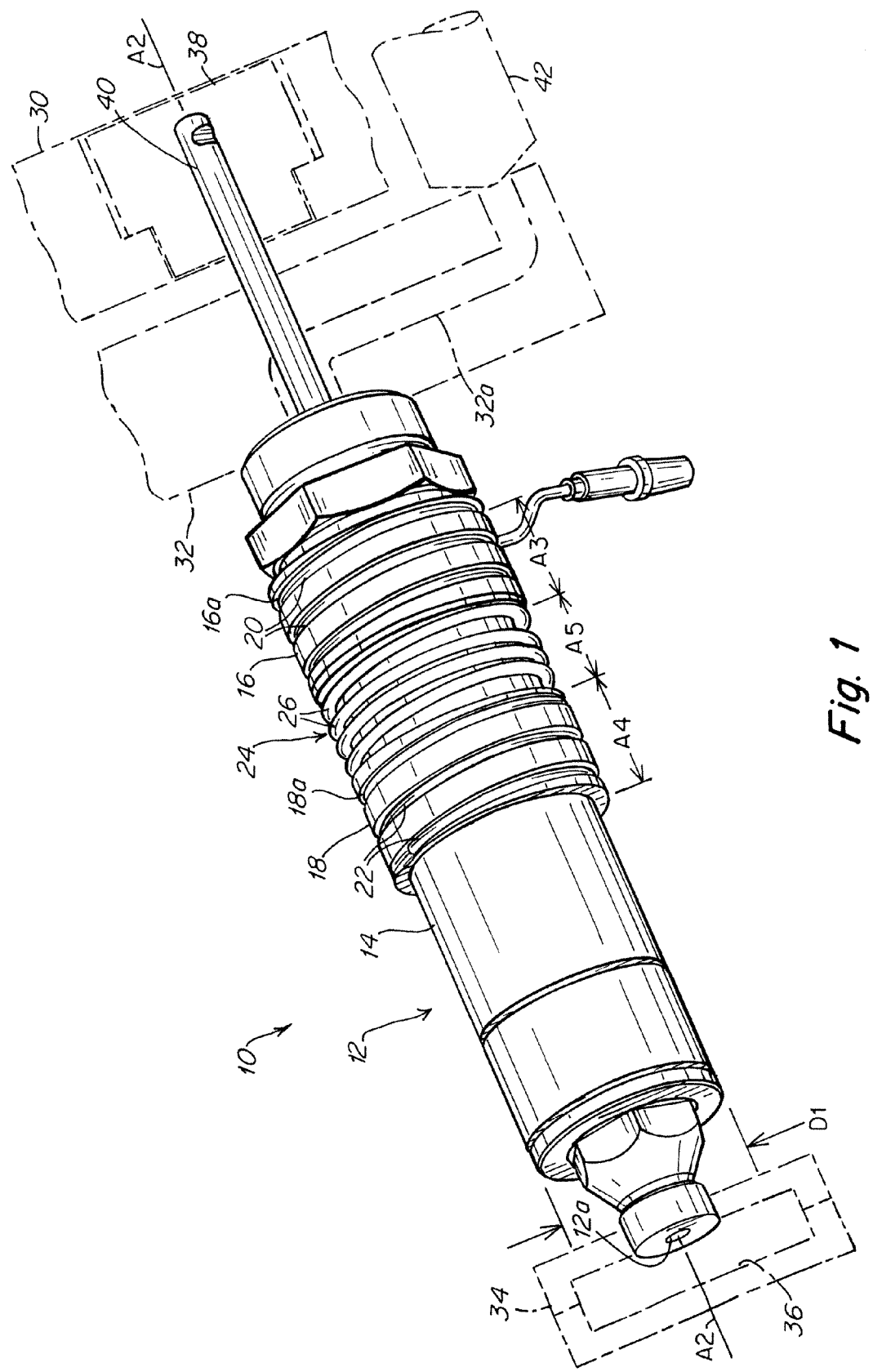
FIG. 1 is a side perspective view of an embodiment of an apparatus according to the invention showing a heater component mounted on or to the outside surface of a nozzle body in an initially assembled form or state.

FIG. 1 shows a fully assembled apparatus 10 according to one embodiment of the invention after the apparatus has been initially assembled. As shown in FIG. 1, a hollow tubular nozzle body 12 has a fluid flow channel or bore 12a extending along an elongated axis A2 and an outer radial surface 14. A pair of tubular mounts, an upstream mount or collar 16 and a downstream mount or collar 18, are mounted on or around the outside surface 14 in thermally conductive communication, contact or engagement therewith. The nozzle and the tubular mounts 16, 18 are preferably comprised of a highly conductive metal material such as aluminum, iron, steel, copper or the like. In this embodiment, the mounts or collars 16, 18 have grooves 16a, 18a engraved on/into their outside surfaces for receiving and mounting the upstream coiled end portion 20 and downstream coiled end portion 22 respectively of a coiled heater tube 24, FIG. 2 at selected positions along the axial length of the fluid flow channel shown as a nozzle in the example of FIG. 2. The coiled tube has a central elongated coil axis A9 which is typically coincident with the fluid channel axis A2. The coil axis A9 is referred to as a "coil axis" while the axis along the length of the tube 24 or tube sections 20, 22, 26 is referred to as the longitudinal axis AX, FIG. 33, of the coil or tube 24 or sections thereof. The receiving/mounting grooves 16a, 18a ensure that the number of coils of the end portions 20, 22 per their axial lengths A3, A4 (see FIGS. 1 and 7) remains the same or substantially the same (and do not significantly stretch axially or shrink radially) when the two mounts or collars 16, 18 are axially separated from each other going from the initial FIG. 1 position to the subsequent separated FIGS. 2-4 position.

Figure 2:
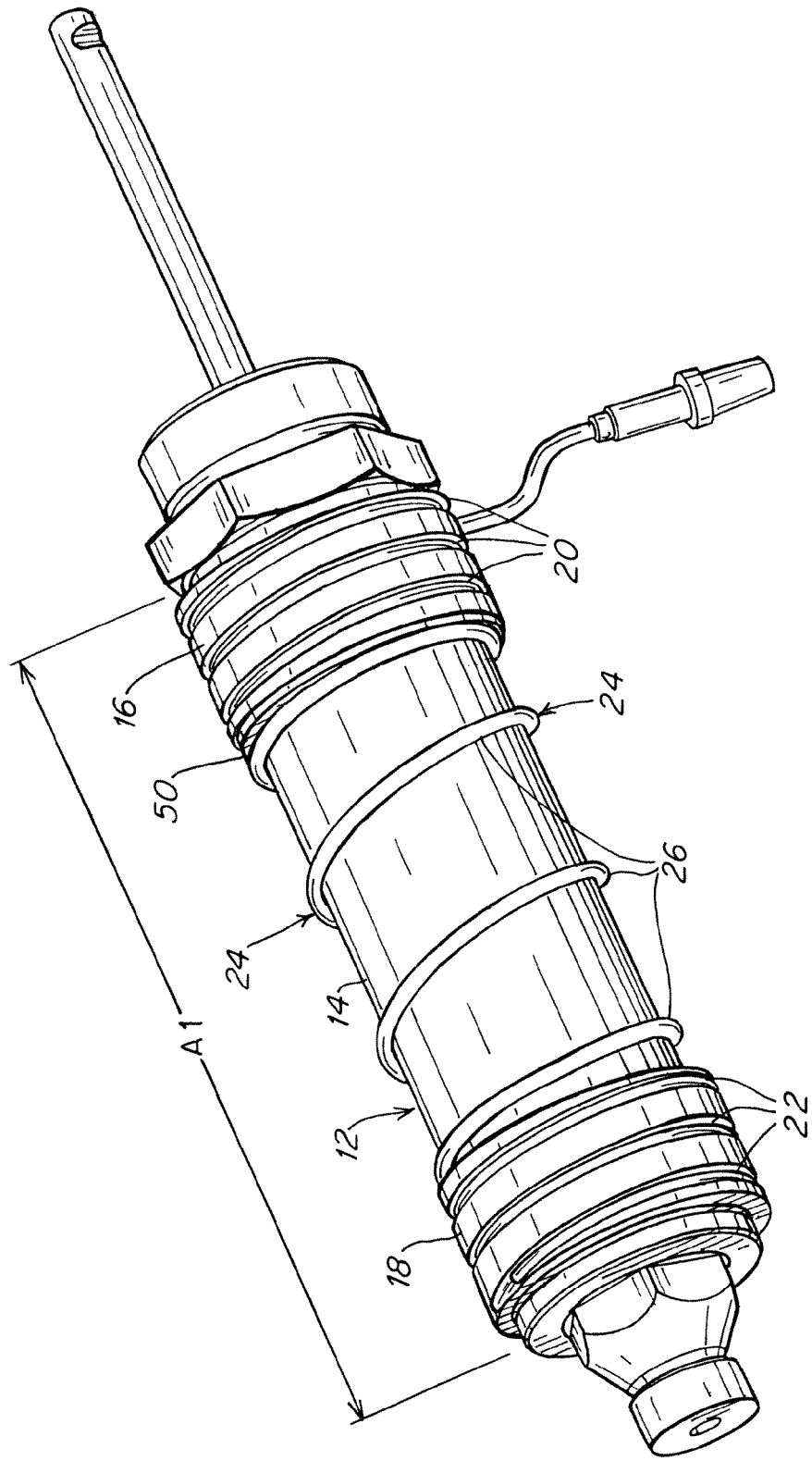
FIG. 2 is a view of the FIG. 1 apparatus showing the heater component in an axially separated or stretched condition.
Figure 7:
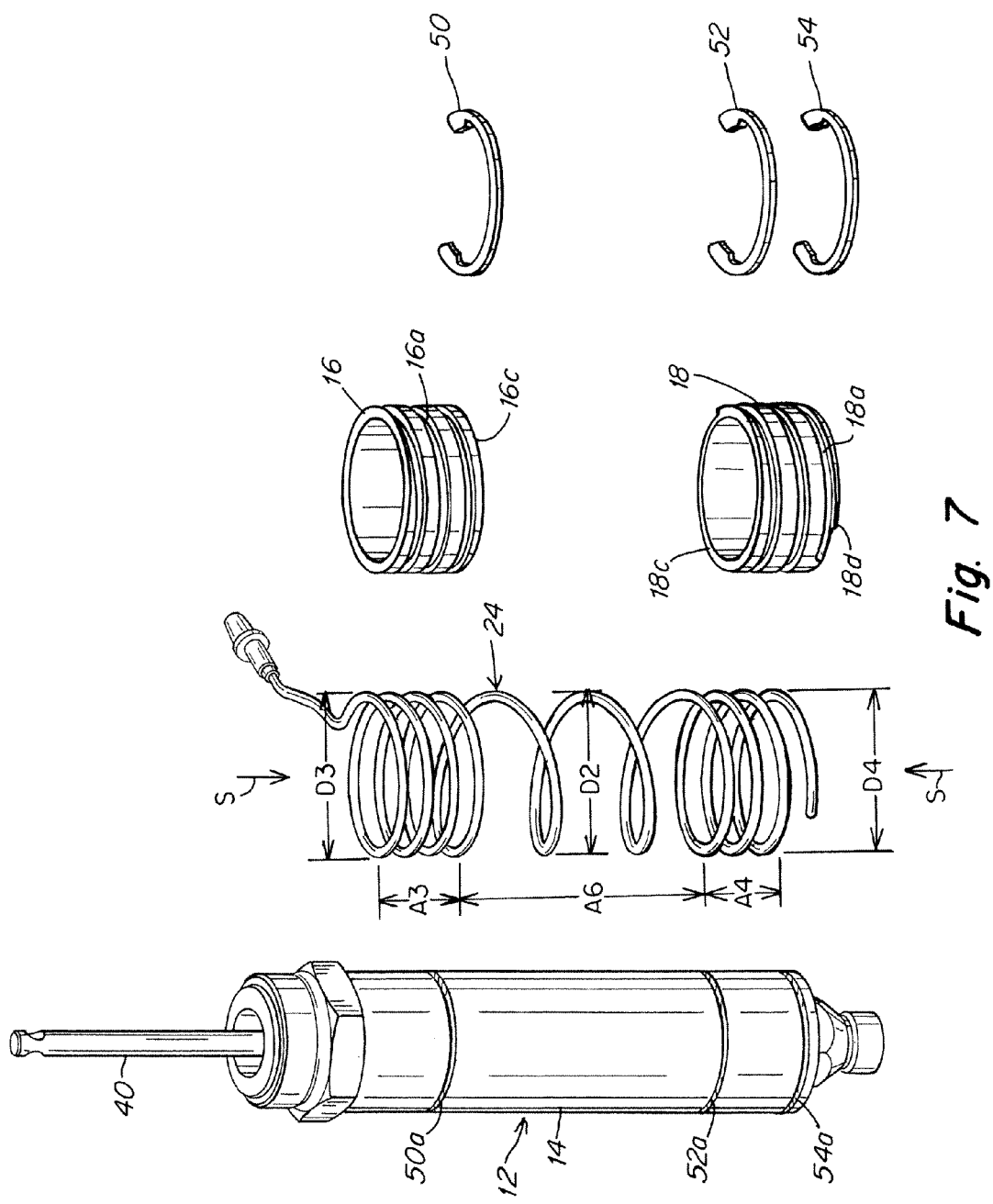
FIG. 7 is a top perspective exploded view of the assembly shown in FIG. 4 showing all of the components exploded from each other.

As shown in FIGS. 1-2, the coiled heater tube 24 has an intermediate coiled portion 26 that connects and extends between the end coiled portions 20, 22. The intermediate coiled portion 26 initially has a minimum axial length A5 (FIG. 1) which can be increased in varying amounts along the axis A9 up to a maximum sized axial length A6 (FIG. 3), e.g. increased from an initial length of about 0.25-6 inches in axial length A5 to a subsequent stretched or larger axial length of about 0.5-12 inches in axial length A6. Similarly, on stretching or increasing in axial length from A5 to A6, the intermediate coiled portion 26 decreases in radial diameter in varying amounts from initial diameter D1 (FIG. 1) to subsequent smaller or reduced diameter D2 (FIG. 7). The reduction in diameter from D1 to D2 causes the intermediate coiled portion of the tube 24 to more snugly engage the outer surface 14 of the nozzle 12 and thus better effect heat transfer or communication between the heated walls of the tube 24 and the body of the nozzle 12.

Figure 3:
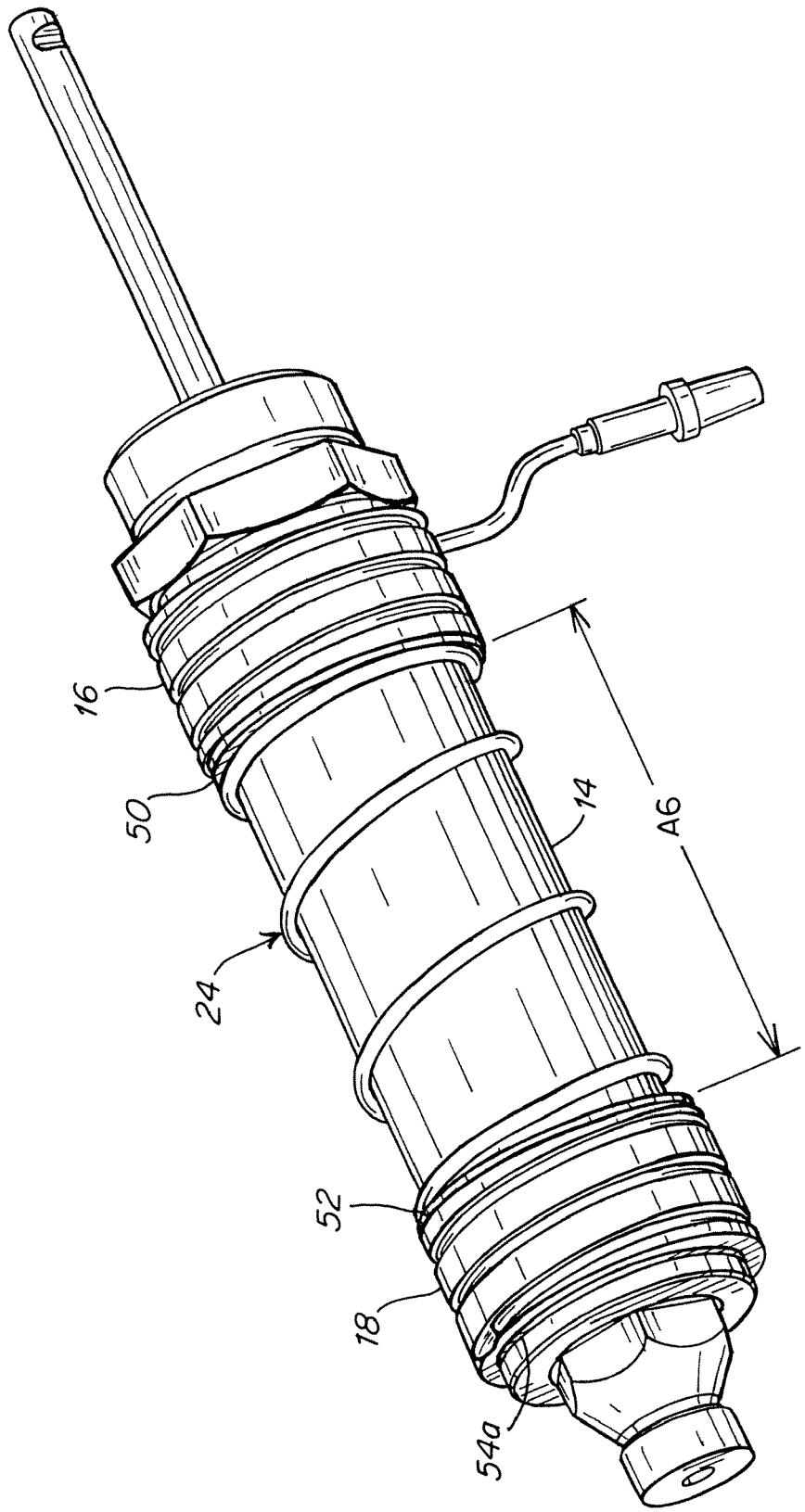
FIG. 3 is a view similar to FIG. 2 showing a snap or interference ring installed on the outside surface of the nozzle body at the upstream end of a downstream tubular mount component to hold the downstream mount in place axially on the outside of the nozzle.
Figure 4:
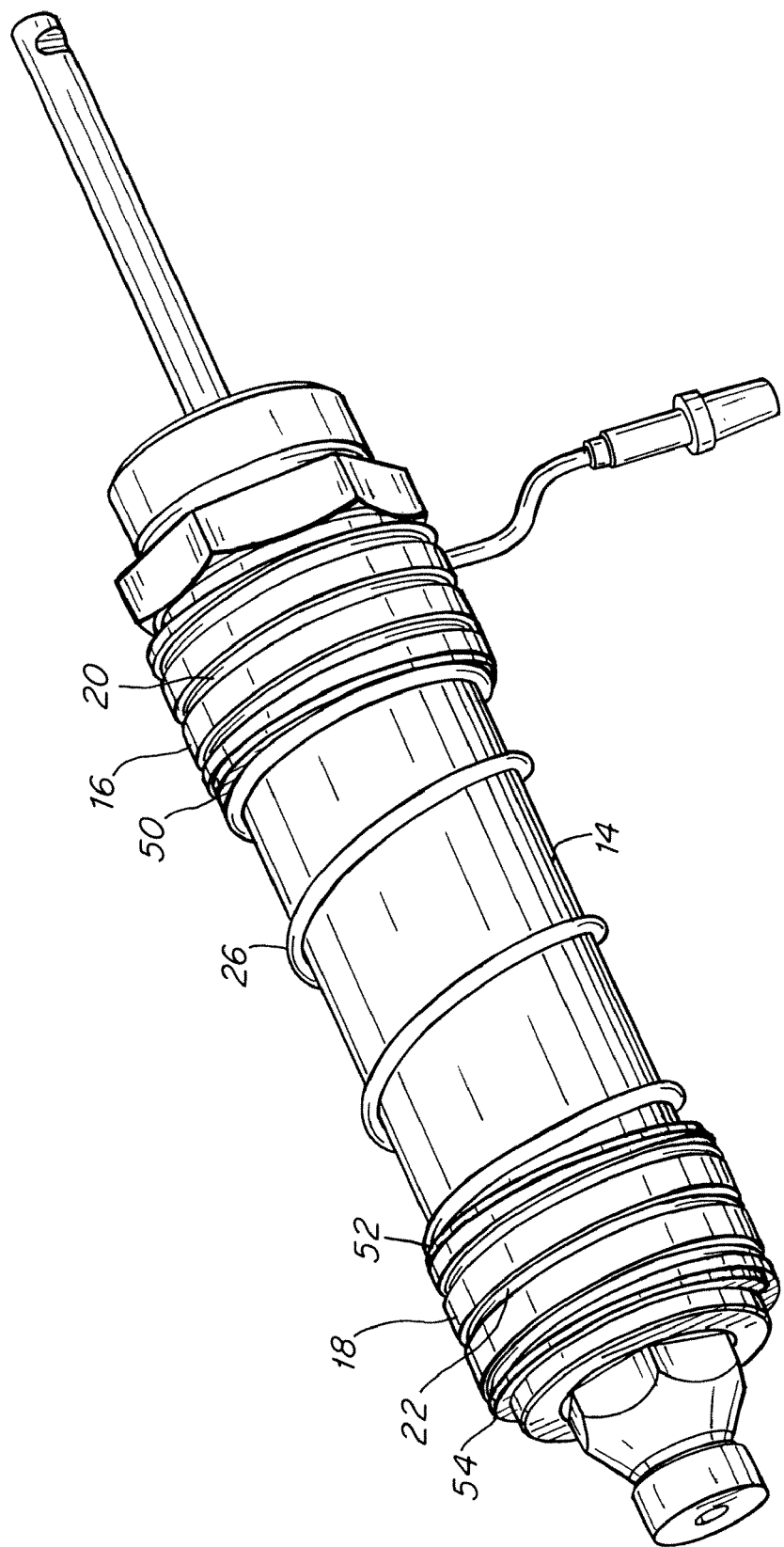
FIG. 4 is a view similar to FIG. 3 showing a second snap or interference ring installed on the nozzle body at the downstream end of the downstream mount.

Preferably when the coiled tube 24 is stretched from the initial position of FIG. 1 to the stretched position of FIGS. 2-4, the diameters D3 and D4 of the end coiled portions 20, 22 remain the same or substantially the same.

The assembly as shown in FIG. 1 typically includes a clamp or back plate 30, a heated manifold or hotrunner 32 and a mold 34 having a cavity 36. An actuator 38 for controllably driving a valve pin 40 along the axis A2 is typically mounted in, on or to one or the other or both of the clamp plate 30 or manifold 32. The components as shown in FIG. 1 are shown in schematic for explanation purposes and can take a wide variety of specific configurations, forms and designs that are peculiar to the design of the mold 34 and injection molding machine 42 with which the hotrunner, clamp plate, actuator and other components of the apparatus are intended to be used.

In this embodiment the fluid flow channel is a nozzle 12 that has an axial bore or fluid flow passage 12a into and through which molten fluid material is injected under pressure for injection into the cavity 36 of the cooled mold 34. The nozzle body 12 is heated by transmission or communication of heat from the walls of the heater tube 24. As shown in the FIGS. 1-10, the fluid flow passage 12a is a passage provided in a nozzle body 12, the downstream end of the nozzle body typically being disposed immediately at the entrance to the cavity 36 of the mold 34. The heater tube 24 could also be disposed around and in thermally conductive communication or contact with another fluid flow passage contained within another component of the system such as a flow passage 32a mounted or contained within the hotrunner 32.

Figure 5:
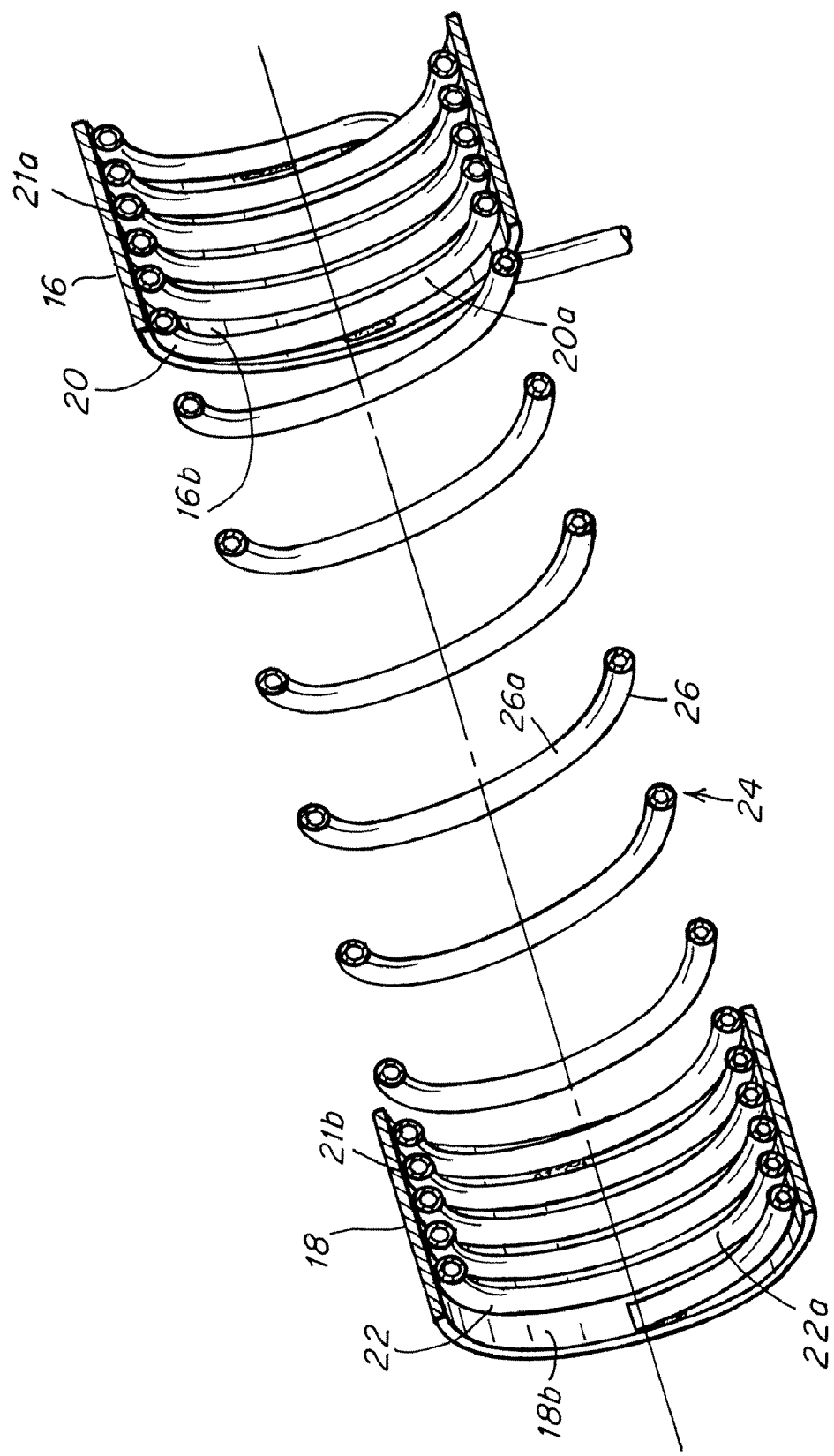
FIG. 5 is an axially sectioned perspective view of an embodiment of the invention where the coiled heater component is attached to the inner radial surface of a pair of upstream and downstream tubular mounts.
Figure 6:
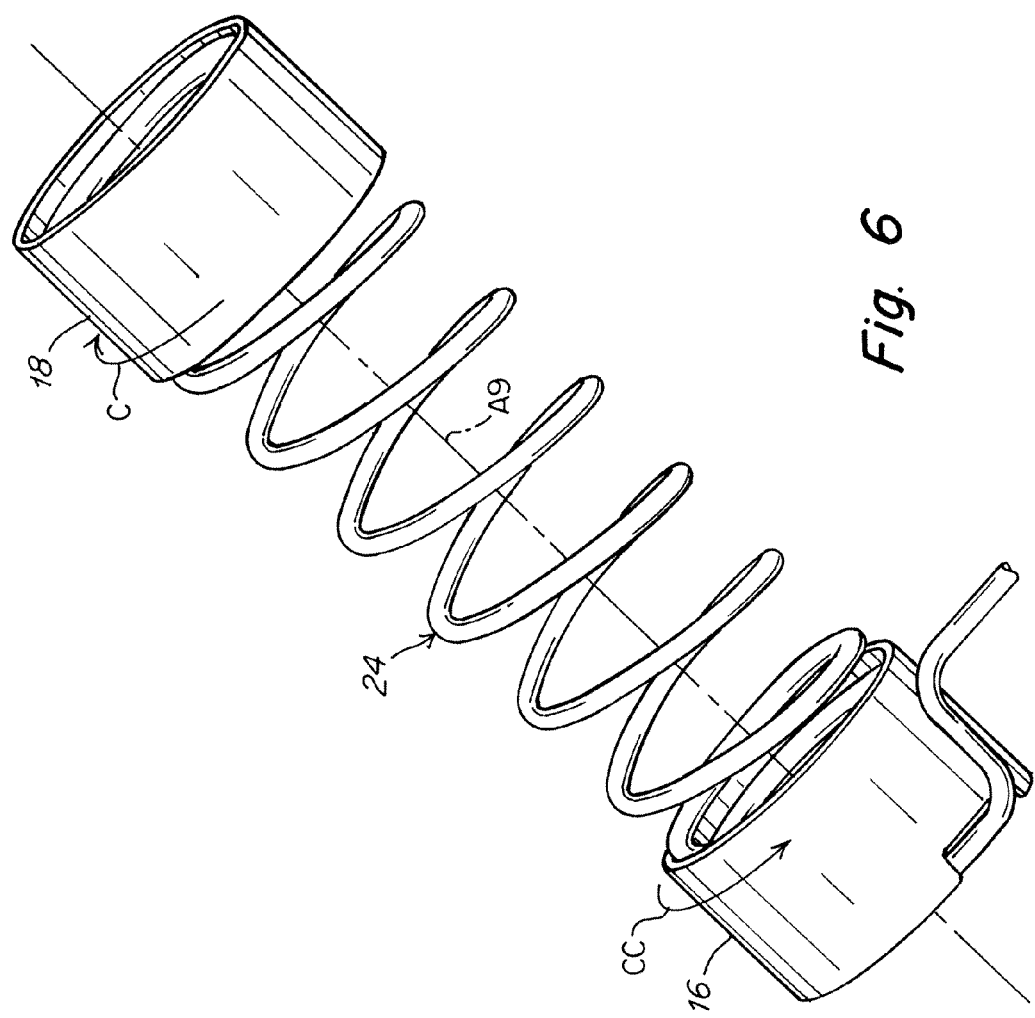
FIG. 6 is a side perspective view of the coiled heater tube and tubular mount components shown in FIG. 5.

In the embodiment shown in FIGS. 5, 6 the radial exterior surfaces 21a, 21b of the tubular walls of the end coiled portions 20, 22 are tack welded to the interior radial surfaces 16b, 18b respectively of end mounts or collars 16, 18 such that the radial interior surfaces 20a, 22a, 26a of the coiled portions 20, 22, 26 of the coiled tube 24 all collectively make thermally conductive contact directly with the radial outer surface 14 of the nozzle body 12. In the FIGS. 5, 6 embodiment, attachment of the coiled ends 20, 22 to the mounts 16, 18 maintain the number of coils per axial length A3, A4 and the diameters D3, D4 of the end coiled portions 10, 22 the same or substantially the same even after axial separation of the mounts 16, 18.

The heater tube 24 itself preferably comprises a hollow tube having a wall comprised of a material such as metal that is highly thermally conductive such as copper, aluminum, steel, iron or the like. The hollow tube 24 has an interior hollow bore or passage in which a heater mechanism such as a wire is disposed in and thermally conductive communication or contact with the wall of the tube. A thermocouple can also be disposed within the tube 24 for measuring temperature at a selected location along the axis A2, FIG. 8 of the tube. The heater wire (shown schematically in FIG. 33) is typically connected to a controllable electrical power input device that allows the user to controllable raise or lower the temperature of the heater wire and also the walls of the heater tube with which the heater wire is in thermally conductive communication.

The coil that forms the heater tube 24 in its original unstretched state as shown in FIG. 1, has a certain limited spring force, S (shown by arrows in FIG. 7), inherent in the coil that tends to cause the coil to be urged back (return) to its un-stretched non-deformed (relaxed) state of FIG. 1 when the tube 24 is stretched to the stretched state of FIGS. 2-4, 7-10. Such spring force can be resisted by the mounts 16, 18 or the like.

With reference to FIGS. 1, 2, 7-10, the heater tube 24 and associated mounts 16, 18 are initially mounted over and around and in close adjacency to the outside surface 14 of the walls of the fluid flow passage 12a of channel body 12, preferably in physical engagement or contact with said outside wall surface 14. The mounts 16, 18 can comprise a preformed section of a tube or a cast that is formed into the shape/configuration of a tube as shown. When initially mounted as in FIGS. 1, 2, the mount 16 is held in axial position by a snap ring 50 that is mounted within a complementary receiving groove 50a engraved within the outside radial surface 14 of the nozzle body 12 (FIG. 7). On separation of the downstream mount 18 from the upstream mount 16 to the position shown in FIG. 2, FIGS. 7-10, the downstream mount 18 is manually slid downstream a selected distance axially away from the upstream mount 16 which is held in axial position by an interference engagement of ring 50 with the downstream end surface 16c of mount 16. Once the downstream mount 18 is slid to the selected downstream position shown in FIGS. 2-4, 7-10, a pair of additional snap rings 52, 54 are fit into complementary grooves 52a, 54a engraved into the outside surface 14 of the wall of the nozzle body 12 (FIG. 7). The snap rings 52, 54 act to fix the position of the mount 18 at the position shown by virtue a similar interference engagement against the upstream 18c and downstream 18d end surfaces of the downstream mount 18.

On initial installation of the subassembly shown in FIGS. 5, 6 onto the exterior nozzle surface 14, the upstream coiled tubes 20 can be tack welded (alternatively other attachment mechanisms such as laser welds or brazing) to the surface 14 in order to fix the axial position of the upstream end portion 20, or alternatively, the end coiled portion 20 can be fixed in axial position by a snap ring similar to the manner described for fixing the axial position of the mount 16 shown in FIGS. 1-4, 7-10.

Figure 8:
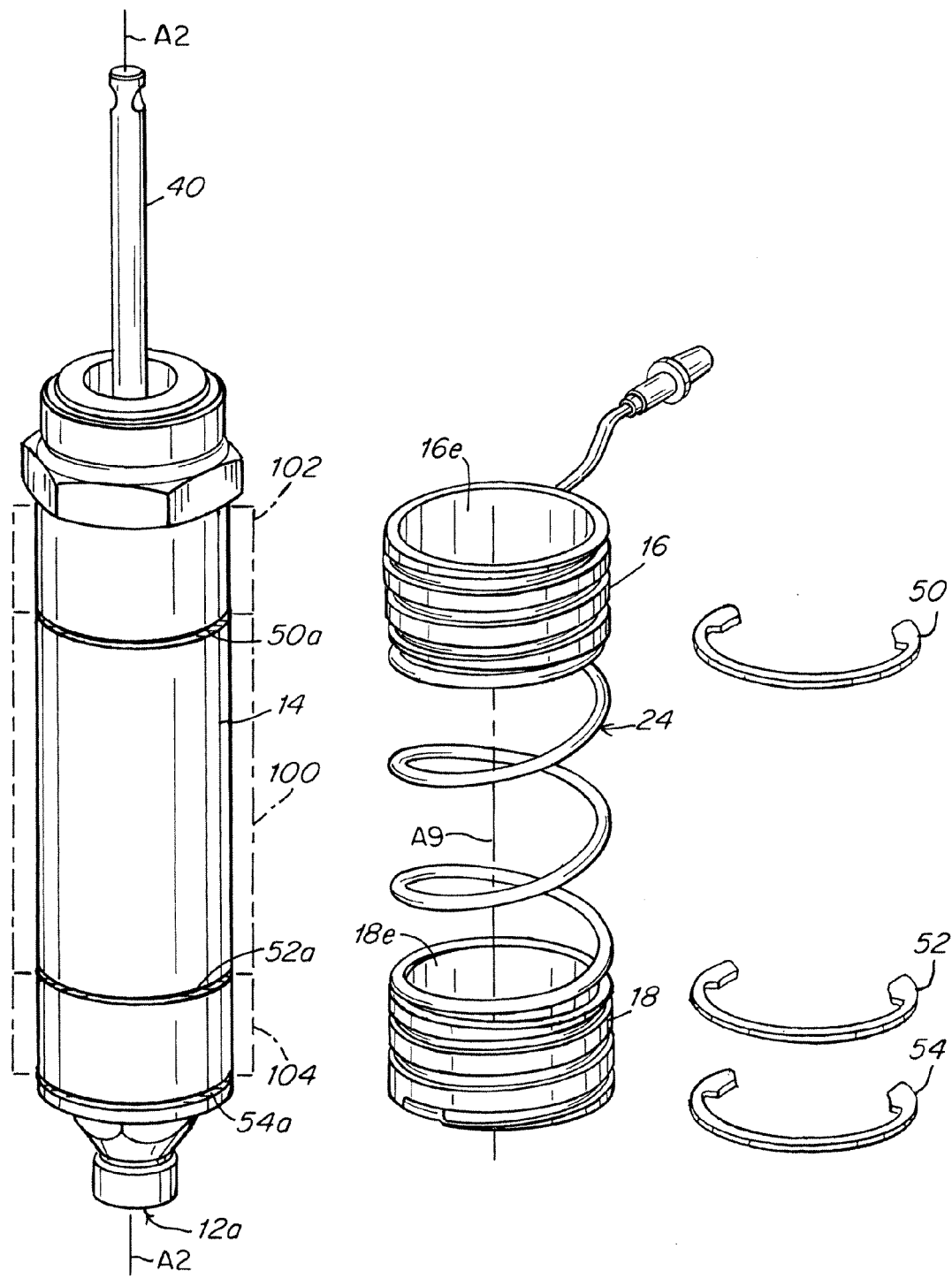
FIG. 8 is a view similar to FIG. 7 showing the coiled heater tube component mounted onto complementary receiving or mounting grooves provided in the upstream and downstream tubular mounts.
Figure 9:
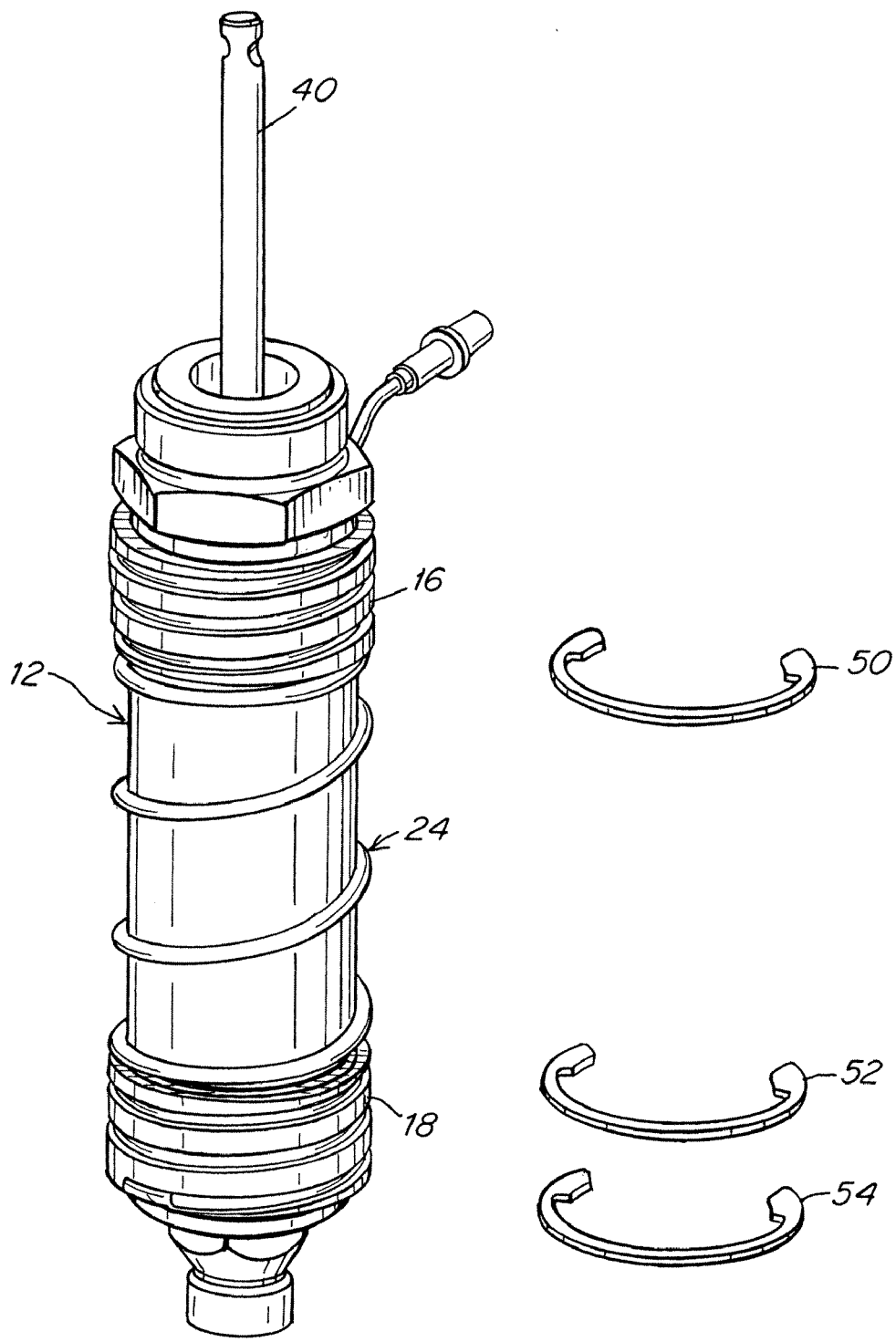
FIG. 9 is a view similar to FIG. 8 showing the coiled heater tube and tubular mount components mounted onto the outer radial surface of a nozzle body.
Figure 10:
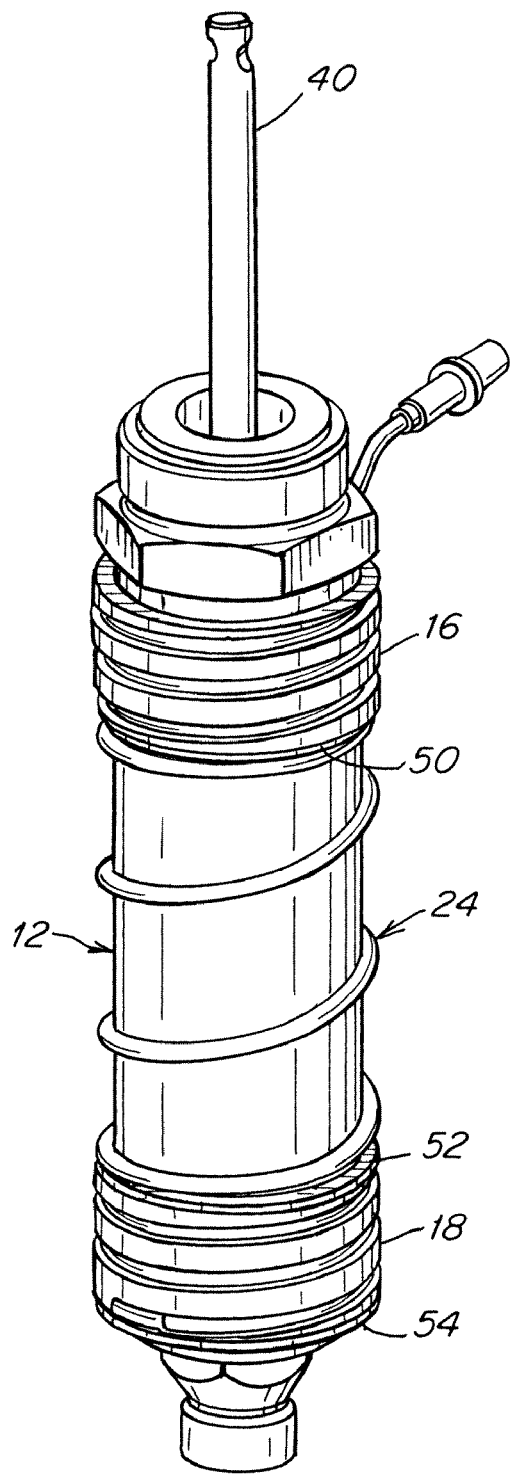
FIG. 10 is a view similar to FIG. 4 showing the components of FIGS. 7-9 fully mounted and assembled onto the outside surface of the nozzle body.

In another embodiment shown in schematic, FIG. 8, the fluid flow channel 12a and the walls 14 of the channel can be first surrounded by a thermally conductive tube or casting 100 over which the intermediate coiled portion 24 is disposed in thermally conductive contact or communication. Similarly, the tube or casting 100 can be extended by upstream and downstream extensions 102, 104 over which the interior radial surfaces 16e, 18e can be disposed in thermally conductive contact or communication. In such an embodiment, grooves similar to grooves 50a, 52a, 54a can be engraved within the outer surface of the additional tube or casting 100, 102, 104 in order to fix the axial position of the tubes 16, 18.

In all embodiments, the walls of the coiled tube 24 are disposed around and arranged in thermally conductive contact or communication with an outer surface of a thermally conductive wall that defines or otherwise surrounds the fluid flow passage whether the wall is integral with the structure that defines fluid flow channel or whether the wall constitutes a physically separate structure.

Figure 11:
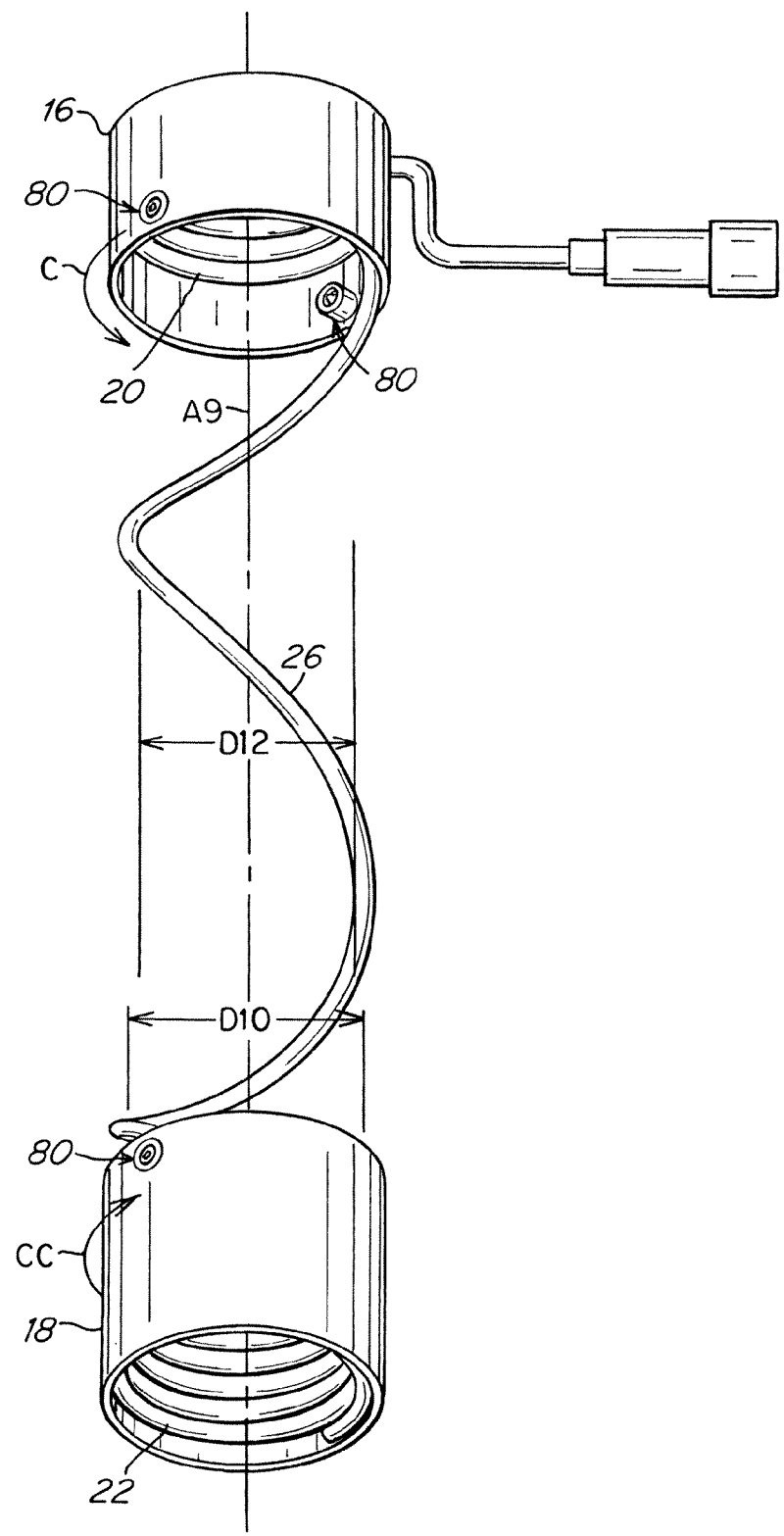
FIG. 11 is a side isometric view of the tubular mount components and end and middle coil portions of the heater apparatus showing the end portions of the coil fixed to the interior surfaces of the mounts and the middle portion in a stretched position.

With reference to FIGS. 6, 11-15, in a preferred embodiment, the tube 24 is mounted onto the outer surface of a nozzle or other flow channel body 12 by first disposing the upstream 20 and downstream 22 end portions of the tube 24 around the respective upstream and downstream portions of the body of the flow channel 12. As can be readily imagined the radial diameters of the upstream 20 and downstream 22 and central coiled portions of the tube 26 are configured to be slightly larger or about the same as the radial diameter of the portions of the flow channel body around which the coiled portions 20, 22, 26 of the tube are disposed. The initial installation process is carried out in a cold state such as at room temperature whereby the collars 16, 18 are slid axially around the nozzle or flow channel body and positioned along the axis of the flow channel body as desired. The upstream 20 and downstream end portions 20 and 22 are then caused to be turned or twisted, manually or otherwise, around the axis A9 in effectively opposite clockwise C and counterclockwise CC directions either by proactively turning each end in such opposite directions or by holding one end in stationary position and turning the other opposing end. Such twisting or turning is carried out in a direction relative to the handedness or direction of the coiled portion 26 so as to cause the diameter of the central coiled portion 26 to tend to reduce its initial cold state diameter D10 to a diameter D12 (that is the same as or smaller than initial diameter D10) that causes the inner surface 26a to snugly engage the outer surface of the flow channel body 12. As shown in FIGS. 6, 11 the direction of turning C and CC is selected relative to the handedness of the coil to tend to cause the coiled portion 26 to reduce its diameter size. Such turning C, CC is typically carried out after the collars 16, 18 are installed onto the flow channel body.

Figure 15:
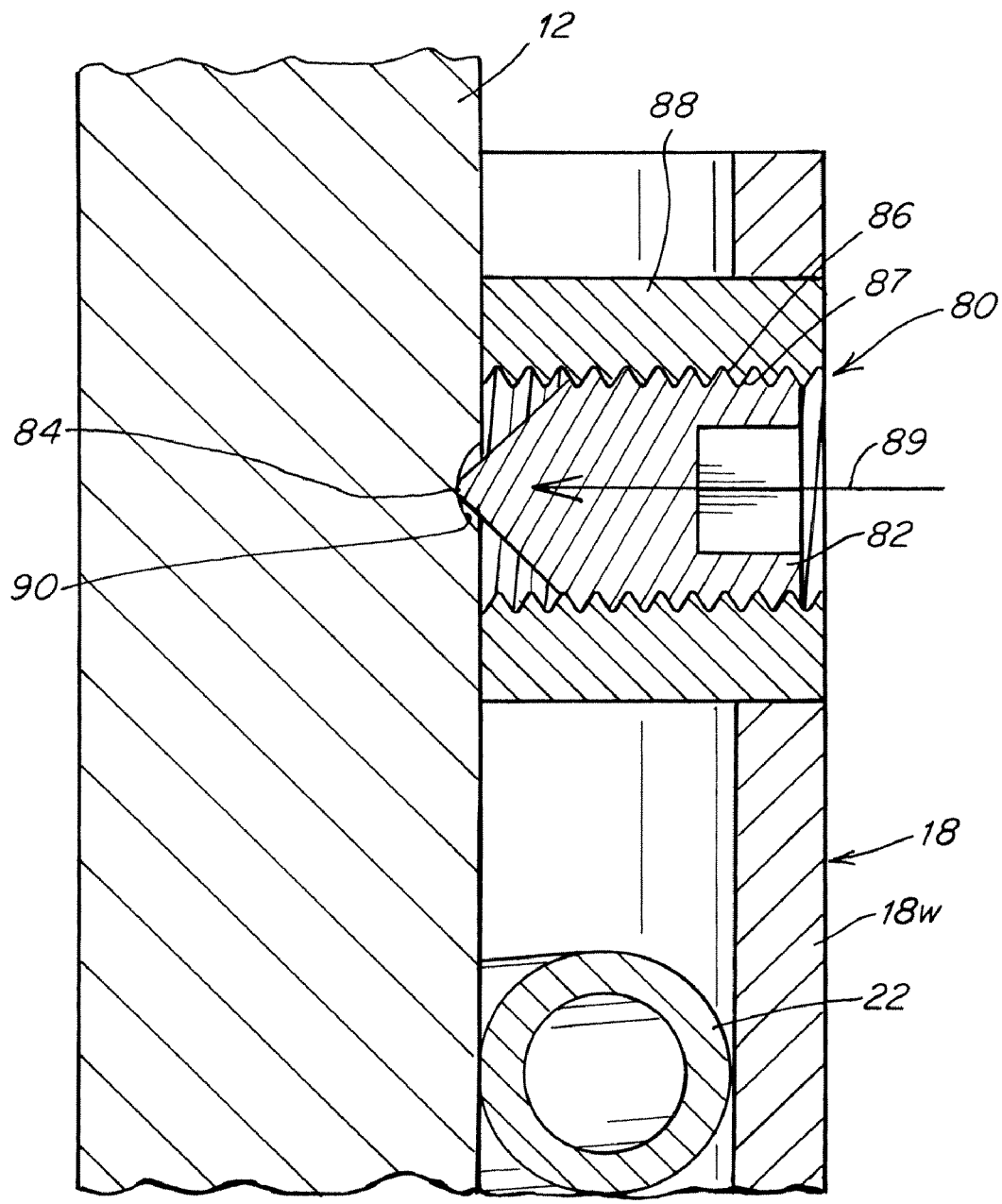
FIG. 15 is another cross-sectional view of a portion of the apparatus of FIG. 12 showing the details of the arrangement of the screw and receiving aperture embodiment for fixing the tubular end mounts in position on the outside of the flow channel or nozzle.
Figure 16:
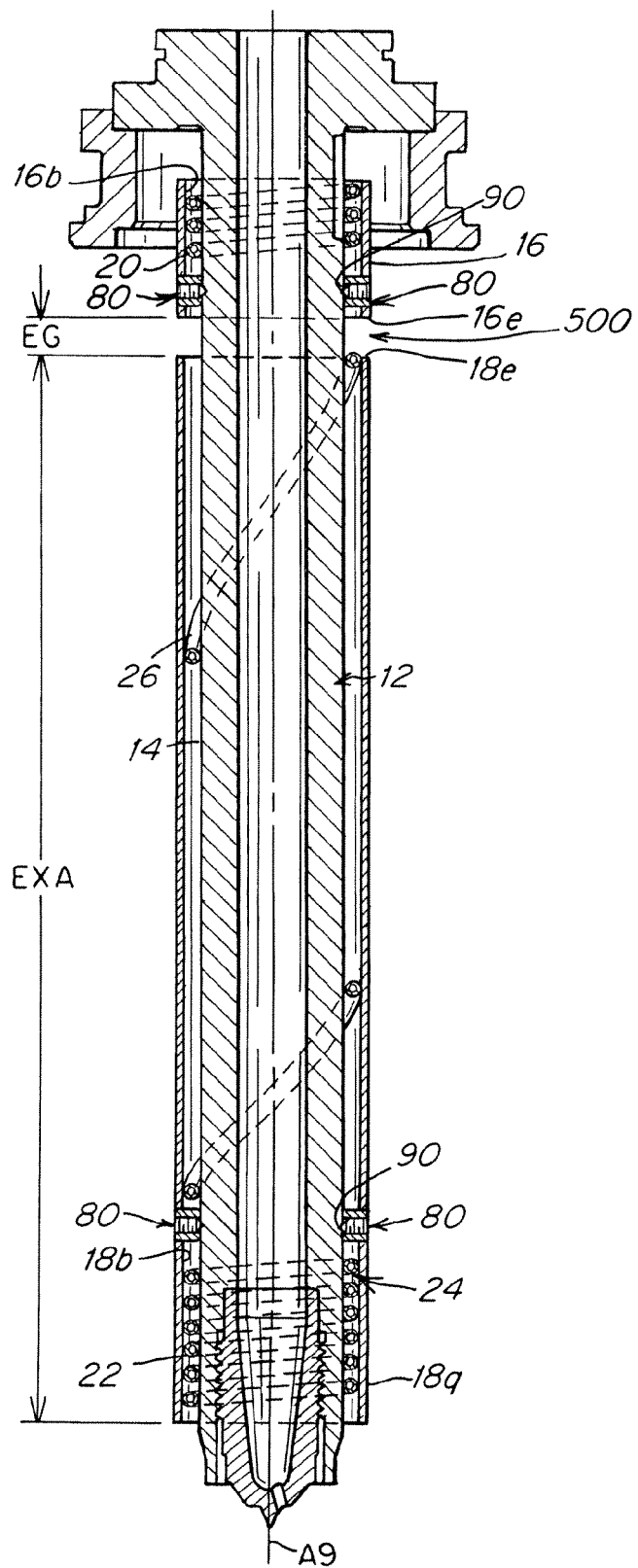
FIG. 16 is a side cross-sectional view of an embodiment of a heater apparatus according to the invention having a downstream tubular mount that has an extended axial length long enough to surround a relatively large portion of the middle portion of the coiled heater tube when the coiled tube has been stretched or elongated along its axial length to its selected final mounted position around the flow channel or nozzle.

As shown in the Figures, the end coiled portions 20, 22 are typically mounted to end mounts or collars 16, 18. End mounts 16, 18 are provided with anti-rotation devices 80 that prevent the mounts 16, 18 together with their attached end coiled portions 20, 22 from unwinding or rotating in a direction opposite to C and CC which are the wind-up direction of rotation that is initially applied to the mounts 16, 18 and/or the end portions 20, 22 upon initial installation. The anti-rotation device or lock 80 as shown comprises a screw 82 having threads 86 that are screwably engaged with complementary threads 87 of a nut 88. The nut 88 is fixedly mounted in or to the wall 16w of the end mount 16 or 18 as shown in FIG. 15. The screw 82 as shown in FIG. 15 has an end projection 84 that can be screwed inwardly into receipt of by a complementary receiving recess 90 provided on the surface of the flow channel body 12. When the projection 84 is disposed in the recess 90, the end mount 16 or 18, an interference or pressure engagement fit is formed between the projection 84 and the inside surface of the recess 90 thus preventing the end mount 16, 18 from rotating around the axis A9 and further preventing the mounts or collars 16, 18 from moving axially along the outside surface of the flow channel 12, Figs. (or flow channel 300a, FIG. 29).

The anti-rotation screws 82 are screwed inwardly into the lock or anti-rotation position shown in FIG. 15 after the end portions 20, 22 or their associated mounts 16, 18 have been rotated in opposing clockwise C and counterclockwise CC directions to cause the inner surfaces 26a of the intermediate coiled portion 26 to snugly engage the outer surface of the flow channel body 12. Once the coiled portion 26 has been snugly installed around the flow channel body 12 and the end portions 20, 22 or their mounts 16, 18 locked into anti-rotating position, the coiled tube has been installed and is then ready for ongoing subsequent operation at elevated temperatures within an injection molding system.

Figure 12:
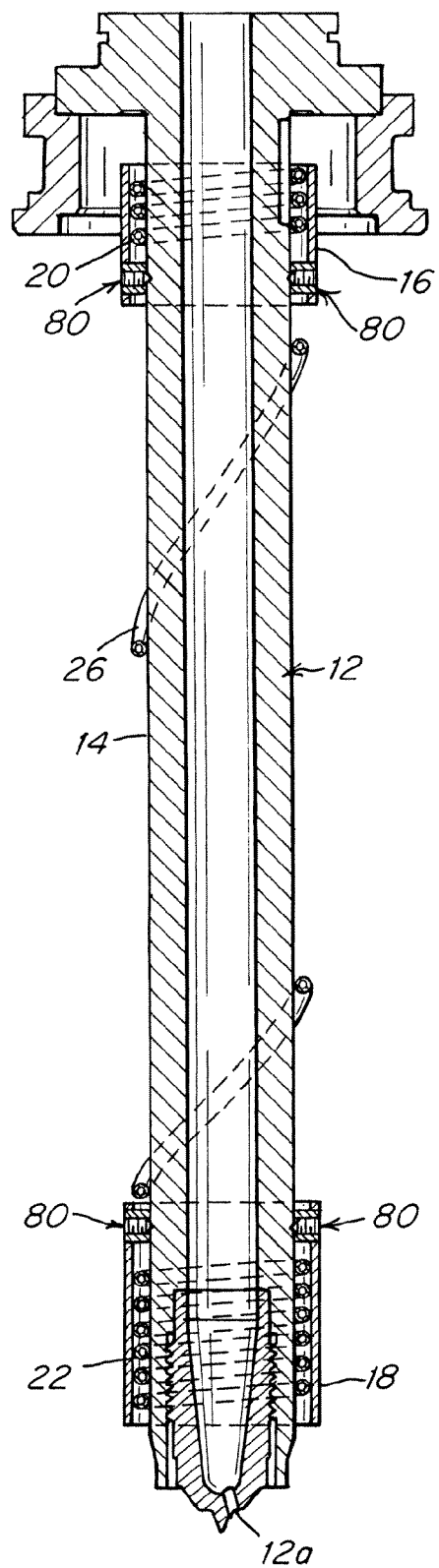
FIG. 12 is a side cross-sectional view of nozzle with a heater apparatus having upstream and downstream tubular mounts screwably fixed at variably selectable positions along the axial length A1 of the nozzle.
Figure 13:
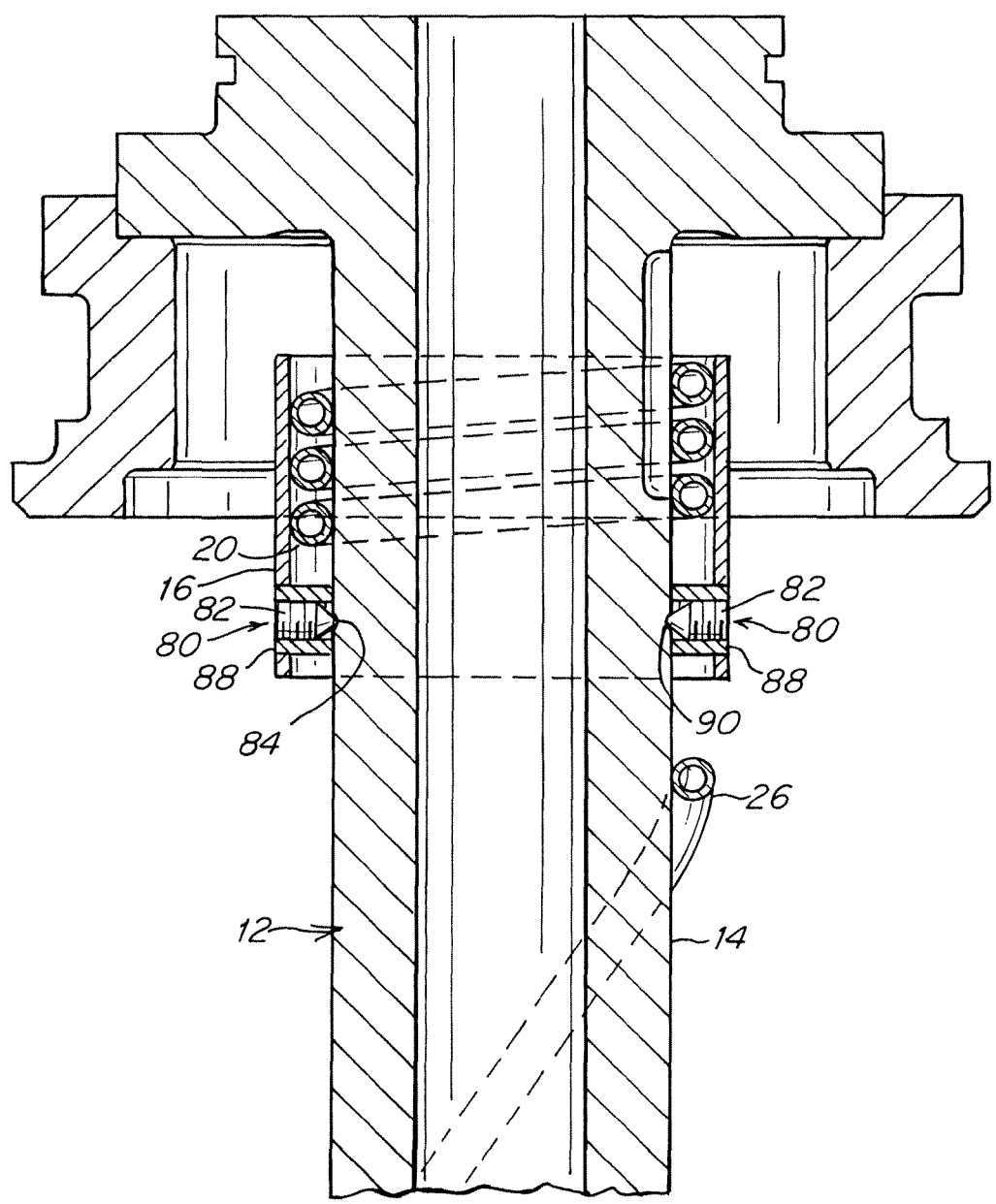
FIG. 13 is a close-up view of the upstream tubular mount portion of the illustration of FIG. 12.
Figure 14:
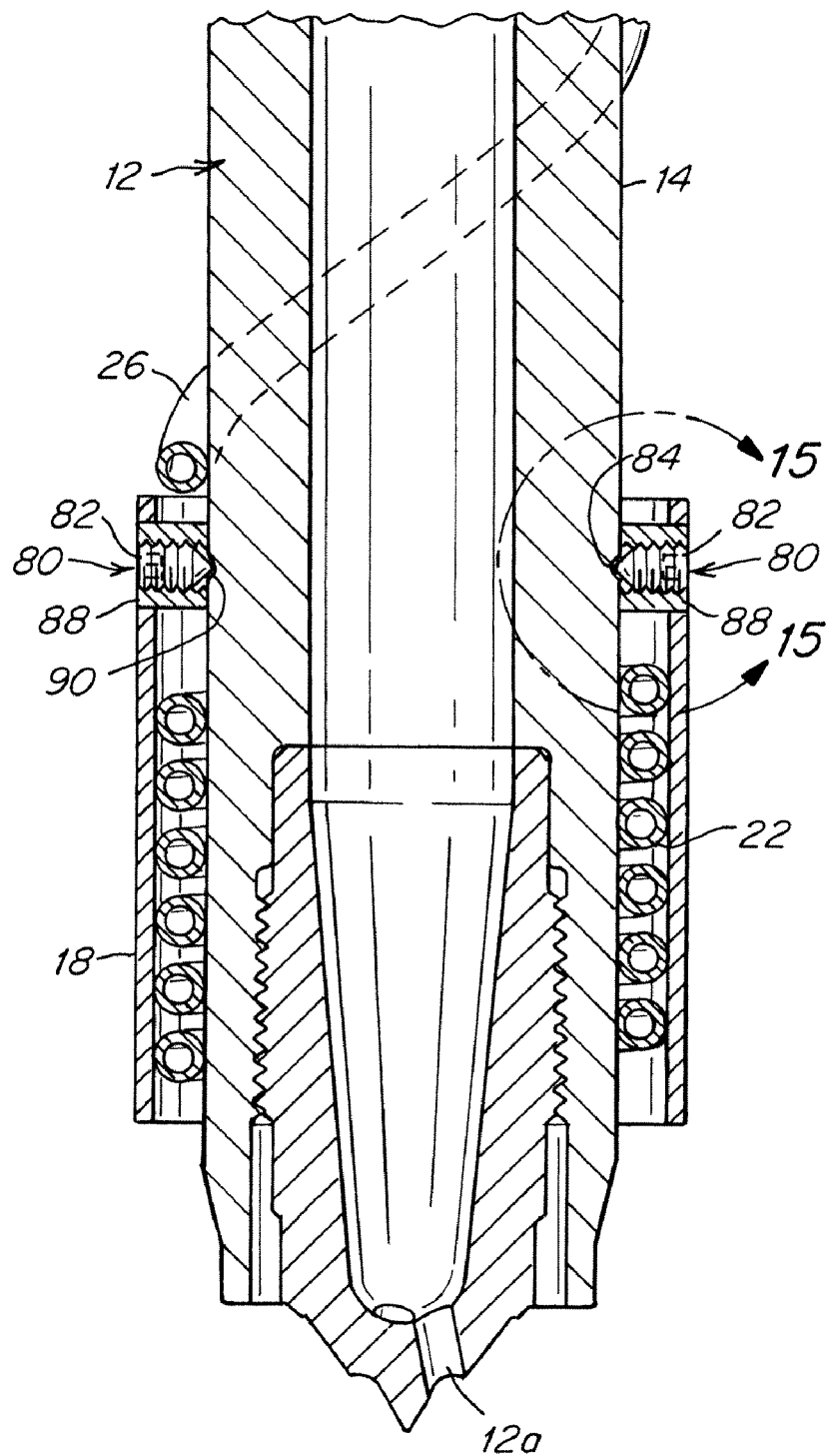
FIG. 14 is a close-up view of the downstream tubular mount portion of the illustration of FIG. 12.

As shown in FIGS. 12-14 the both the upstream and downstream end mounts 16, 18 are preferably provided with suitable lock devices 80. On initial installation, the process is typically carried out by first locking one of the upstream 16 or downstream 18 mounts onto a corresponding upstream or downstream end of the channel body 12 and then turning either the other unlocked mount 16, 18 in either the C or CC direction that will tend to cause the intermediate portion 26 to reduce its radial diameter and then once a firm snug engagement of the surfaces 26a with the outer surface of the channel body 12 has been ensured by such turning, the remaining unlocked mount 16, 18 is then locked into anti-rotation position, the result being that the intermediate coiled portion 26 is snugly engaged around the channel body 12 and locked into such a position and engagement.

Figure 17:
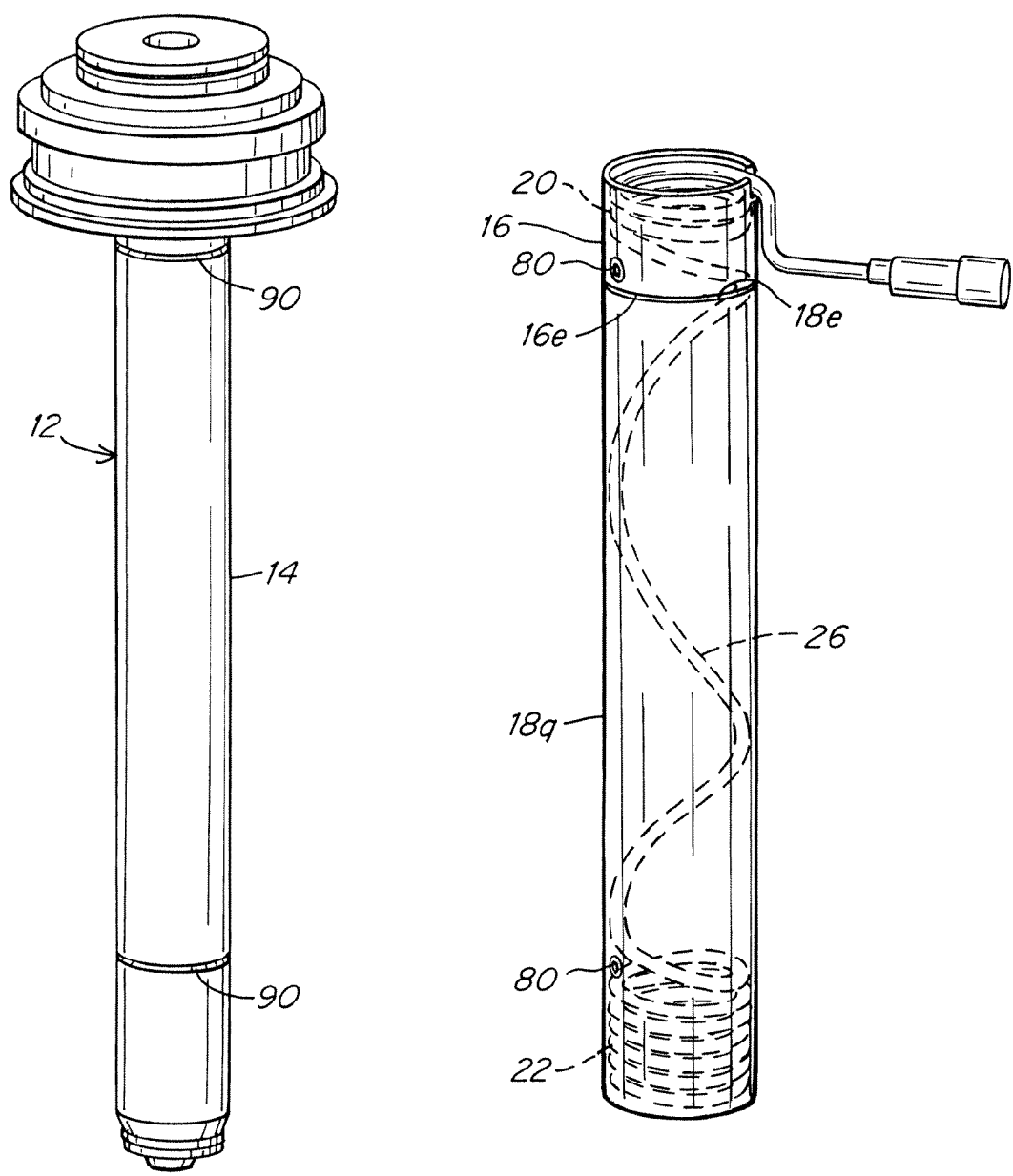
FIG. 17 is a front perspective view of a nozzle and the heater apparatus of FIG. 16 prior to the heater being installed over the outside surface of the nozzle and prior to the upstream and downstream mounts of the heater being mechanically separated from each other along the axis of the apparatus such that the coiled heater tube is extended in axial length to its extended position as shown in FIG. 16.
Figure 18:
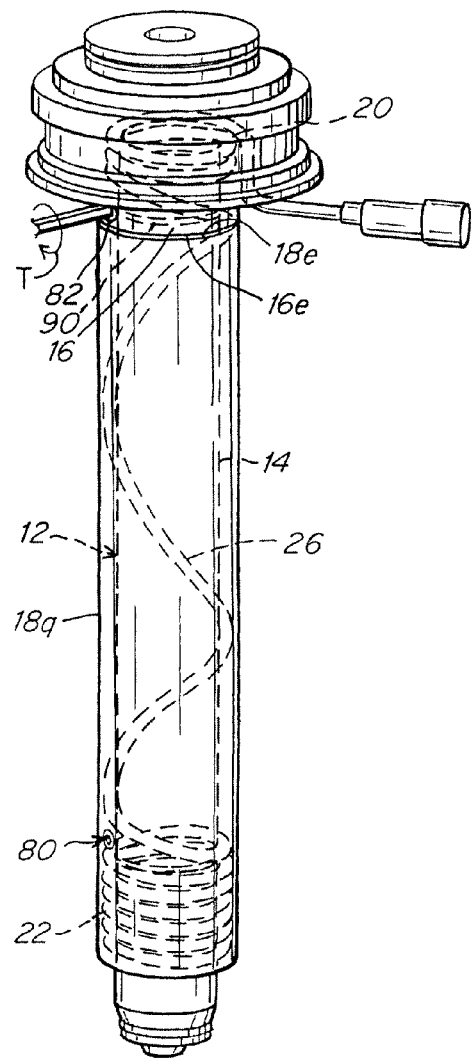
FIG. 18 is a front perspective view of the nozzle and heater of FIG. 17 showing the heater assembled or installed over the outside surface of the nozzle without the coiled heater tube being extended.
Figure 19:
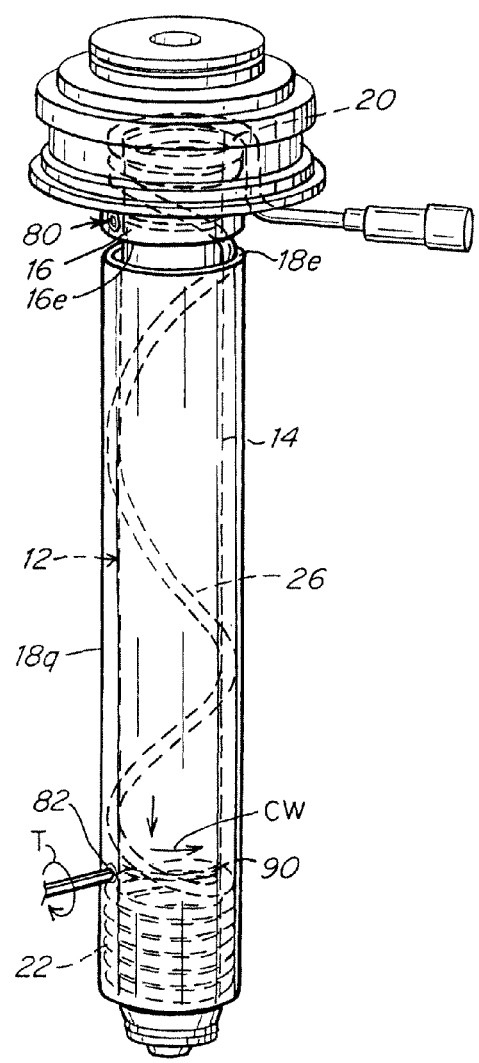
FIG. 19 is a process of installation view of the FIG. 18 apparatus showing the coiled tube having been extended, the upstream tubular mount having been affixed to the nozzle surface and the downstream tubular mount in process of being affixed to the tube via turning T of the screw 82.

In the embodiment shown in FIGS. 16-19, the apparatus comprises two collars 16, 18q, the downstream collar 18q having an extended axial length EXA that is long enough to encompass at least about 60%, typically at least about 75% and most typically at least about 90% of the axial length A6 of the middle section 26 of the heater tube when extended. As shown in FIGS. 17, 18, the apparatus of this embodiment is first installed over and around the outside surface 14 of the channel body 12 in its non-extended state, and subsequently, FIG. 18, the upstream mount 16 is secured to the outside surface 14 by locking lock 80 via turning T of screw 82 until engaged in recess 90 as described with reference to FIG. 15 above. Then, FIG. 19, downstream collar 18q is pulled or separated axially away from the already affixed collar 16 by a selected axial distance EG with the middle section 26 extending in axial length during the separation or pulling process. During or after the process of separating upstream 16 and downstream 18q collars, the two collars 16, 18q may be rotated in the same manner as described above regarding the FIG. 11 embodiment to ensure that the middle section 26 engages the outside surface 14 of the channel body 12. Then, FIG. 19, the downstream collar 18q is affixed to the outside surface 14 with lock 80 via turning T of screw 82 in the same manner as described above. As can be readily imagined, the axial lengths of collars 16, 18q, tube sections 20, 22, 26, the length and number of coils of middle section 26 and the axial extensibility EG of middle section coils 26 are preselected relative to the known axial length A1 of the flow channel 12a of channel body 12 so that a predetermined portion of or all of the axial length A1 of the channel body is surrounded by the heater tube 24. In this embodiment, as with all embodiments, the upstream and downstream coils 20, 22 are affixed to their respective collars or mounts while the middle section 26 is not affixed. In this embodiment, at least about 60% of the axial length of middle section 26 is circumferentially surrounded by the inside surface of collar 18q. Preferably the inside surface of collar 18q is closely adjacent to (less than about 0.1 inches away from) or engages/contacts the outer circumferential surface of the coiled section 26 before and after installation on the channel body 12.

In the FIGS. 16-19 embodiment, a relatively small air gap 500 is left along the axial direction or axis between a downstream terminal end 16e of the upstream tubular mount 16 and an upstream terminal end 18e of the downstream tubular mount 18q, the air gap 500 ranging in distance EG between about 0.3 inches and about 15 inches, typically between about 0.3 inches and about 12 inches, more typically between about 0.3 inches and about 8 inches and most typically between about 0.3 inches and about 6 inches. The air gap 500 is selectably variable in axial length EG by the user to enable variable selection in the uniformity of temperature along the axial length of the coil including the portion of the coil length extending along the axial length of the air gap.

In the embodiments shown in FIGS. 11-32, the heater element contained within and disposed throughout the bore of the heater tube 24 is typically configured to be a non-coiled wire that has a uniform heat output along the entire axial length of the heater element such that the amount of heat generated per length of the tubing 24 or length of heating element is essentially the same. In such embodiments where the heater apparatus is installed onto a nozzle body 12 whose upstream end is typically engaged against or disposed closely adjacent to a manifold or hotrunner 32 plate (as shown for example in FIG. 1), the upstream section 20 of coils typically comprises a lesser number of coils than the downstream 22 section comprises because the plate 32 is separately heated to elevated temperatures thus requiring less heat input to the upstream end of the channel 12 than the downstream end of the body 12 requires because the downstream end of the body 12 is engaged against or disposed closely adjacent to a mold 34 which is typically separately cooled and cooler in temperature, FIG. 1, than the temperature desired for the flow channel body 12. Similarly, in the embodiment shown in FIG. 29, where the heater apparatus 16, 18, 20, 22, 26 is installed onto a molten material inlet tube 300 (namely a flow channel body that connects an injection molding machine to a hotrunner), the upstream coiled section 20 of the heater 24 comprises more coils than the downstream section 22 because the upstream portion or end of the inlet tube 300 that is surrounded by collar 16 and section 20 is in contact with a locating ring 310 that is not heated thus requiring more heat generation relative to the downstream portion or end of the inlet tube 300 that is surrounded by the downstream collar 18 and downstream coils 22 is in thermally conductive contact with or in close adjacency to a heated hotrunner or manifold 32 thus requiring less heat output to the flow channel body 300 in the downstream end area of the inlet tube 300. As shown in FIG. 29, the upstream end of inlet tube 300 is in thermal contact with a locating ring 310 and has a spherical radius R which mates to the tip of an injection molding machine 42. The inlet tube 300 connects the material flow output 320 from the barrel of the injection molding machine and routes the material flow through flow channel 300a to the inlet port 33 of a heated hotrunner or manifold 32. The upstream and downstream 16, 18 collars are shown locked into their final installed positions on inlet tube 300 in the same manner as described elsewhere herein for embodiments comprised of two collars such as described with reference to FIGS. 1-19. In the FIG. 29 embodiment as with other embodiments, the middle section 26 requires fewer coils because the middle section of the inlet tube 300 requires less heat along its axial length A6 to maintain molten material flow at a uniform temperature with the temperature of the molten material along other sections along the length of the axial flow length A1 of the flow channel 300.

As described below in the alternative embodiment of FIG. 33, the number of tube 24 coils contained in each specific heater tube section 20, 22, 26 can be widely varied to selectively control heat output in each section 20, 22, 26 where the actual heat generating elements PC, MC, DC contained within heater tube sections 20, 22, 26 can vary in their degree of coiling and thus their degree of heat output.

In a two piece collar embodiment such as in FIGS. 16-20, a relatively small air gap 500 is left along the axial direction or axis between a downstream terminal end 16e of the upstream tubular mount and an upstream terminal end 18e of the downstream tubular mount, the air gap ranging in distance EG between about 0.3 inches and about 15 inches, typically between about 0.3 inches and about 12 inches, more typically between about 0.3 inches and about 8 inches and most typically between about 0.3 inches and about 6 inches. The air gap 500 is selectably variable in axial length EG by the user to enable variable selection in the uniformity of temperature along the axial length of the coil including portion of the coil length extending along the axial length of the air gap.

Figure 20:
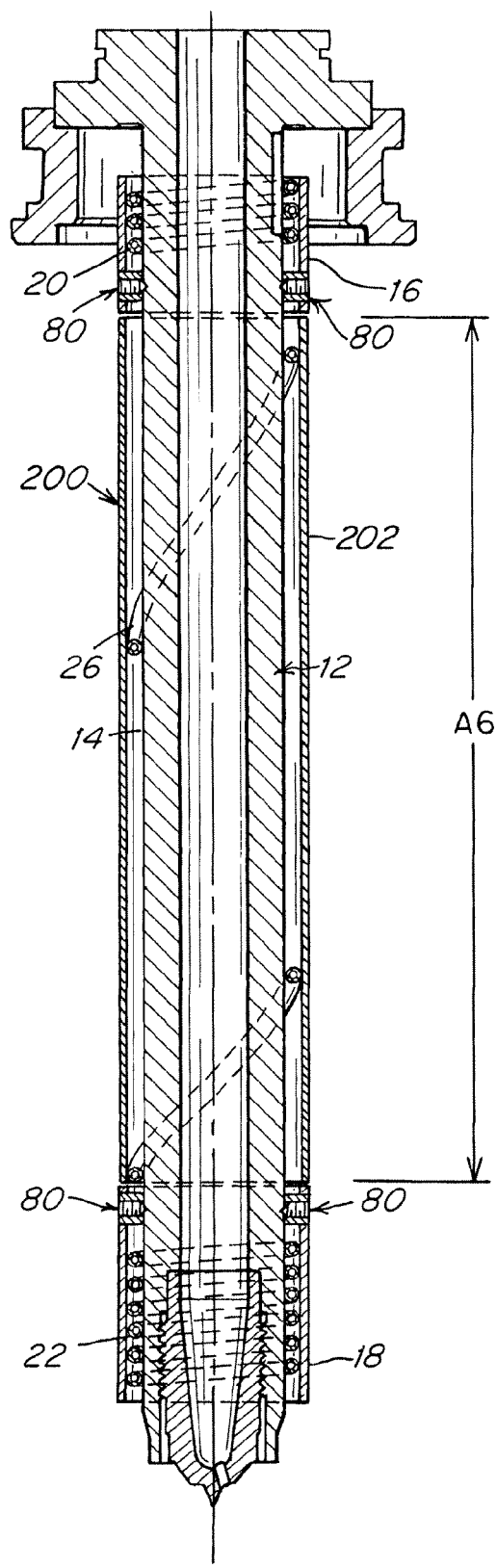
FIG. 20 is a side cross-sectional view of the finally installed embodiment of the invention shown in FIGS. 21-28 where the heater apparatus is comprised of three tubular mounts, an upstream 16, middle 200 and downstream 18 mount.
Figure 21:
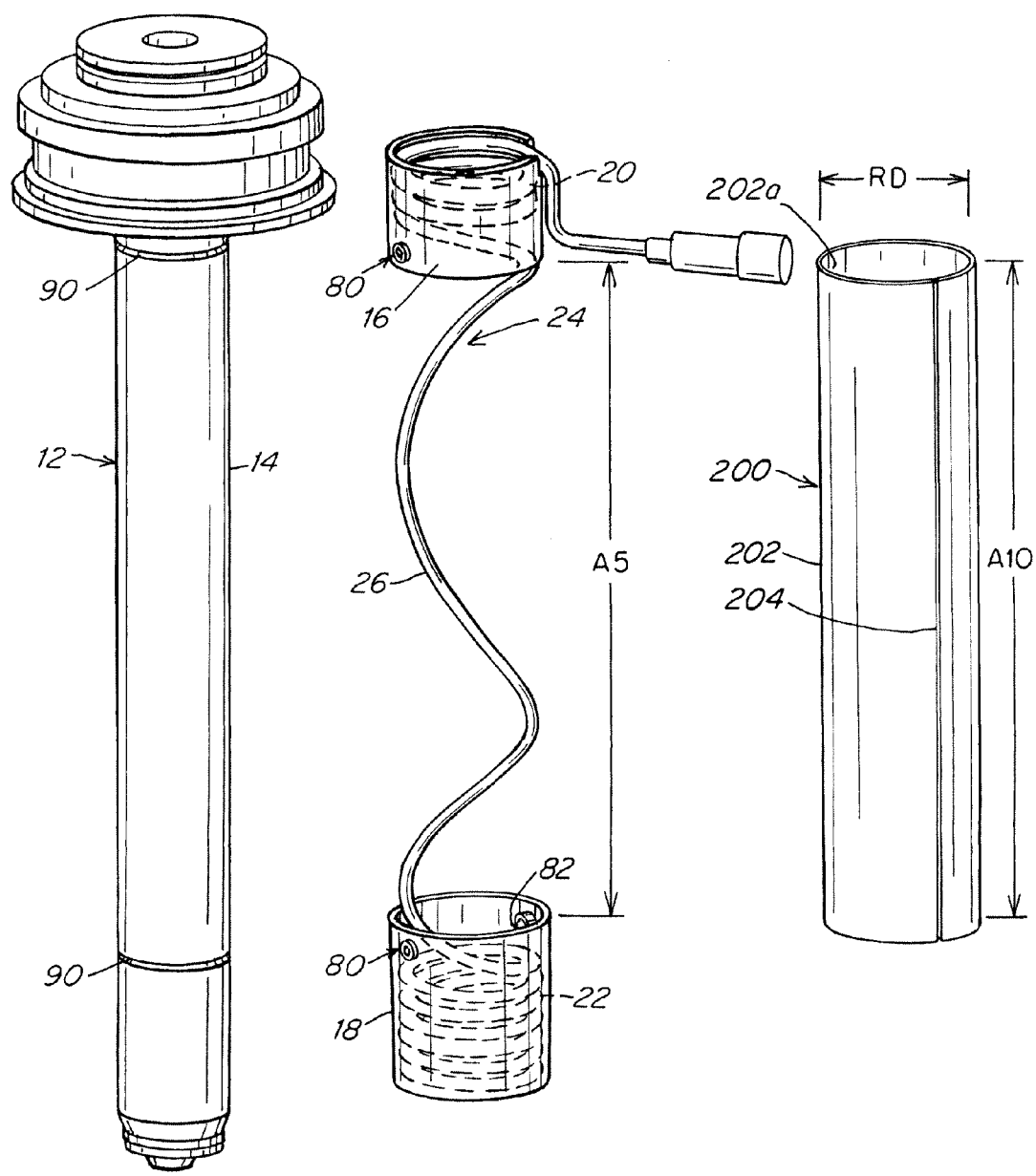
FIG. 21 shows the first step in the sequence of installation steps of the FIG. 20 apparatus showing the upstream 16 and downstream 18 mounts of the heater having been axially pulled or separated away from each other to extend or stretch the middle coiled portion 26 of the heater tube into a larger pitched and smaller diameter coil relative to its original non-extended coiled state.
Figure 22:
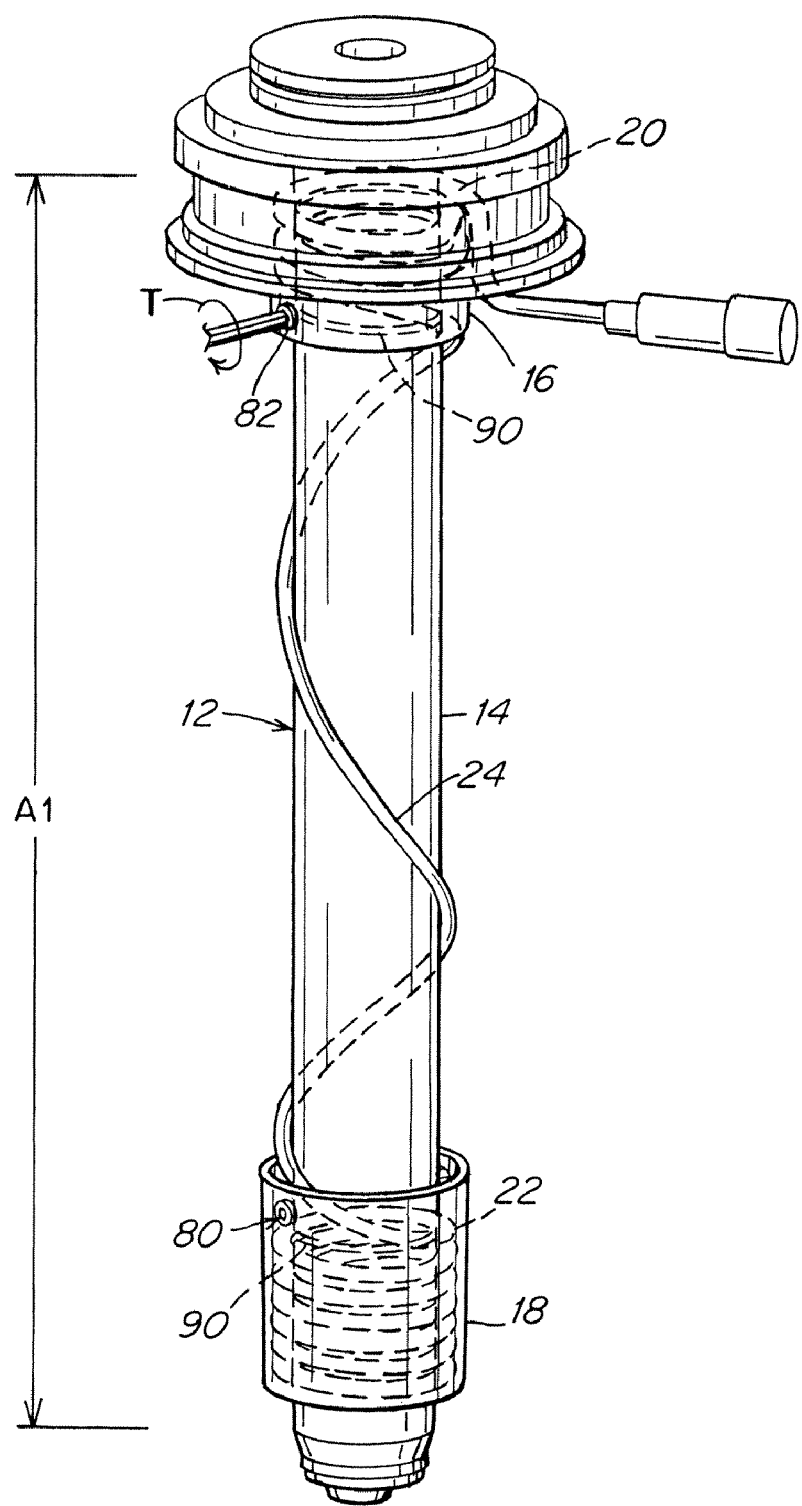
FIG. 22 shows the next step in the sequence of installation steps of the FIG. 20 apparatus showing the axially separated upstream 16 and downstream 18 mounts and the extended coil 26 disposed in the selected position around the exterior surface of the nozzle along a selected axial length of the nozzle bore or flow channel with the upstream mount 16 in process of being affixed to the surface of the nozzle via turning of screw 82.
Figure 23:
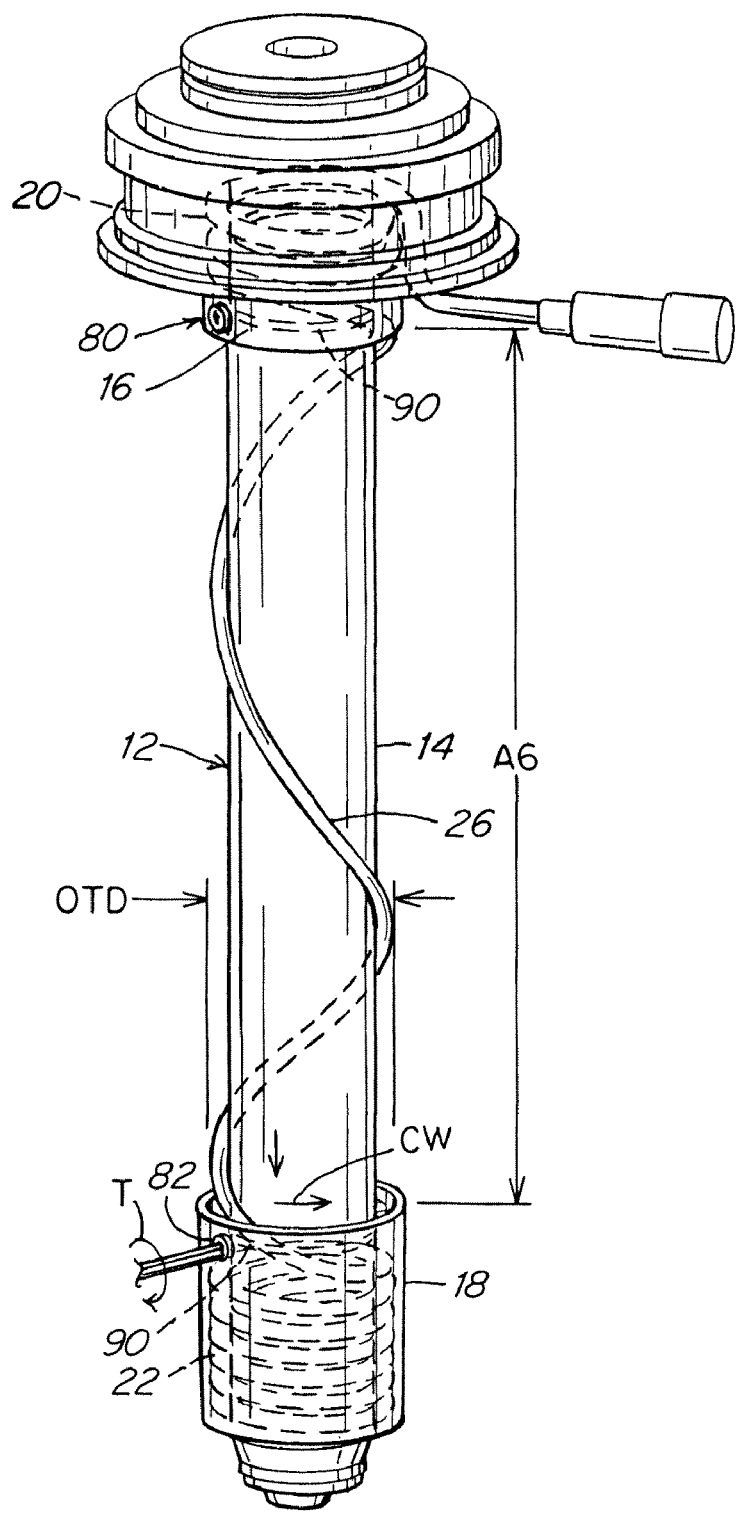
FIG. 23 shows the next step in the sequence of installation steps of the FIG. 20 apparatus subsequent to the FIG. 22 step showing the downstream mount 18 in process of being affixed to the surface of the nozzle via turning of screw 82.
Figure 24:
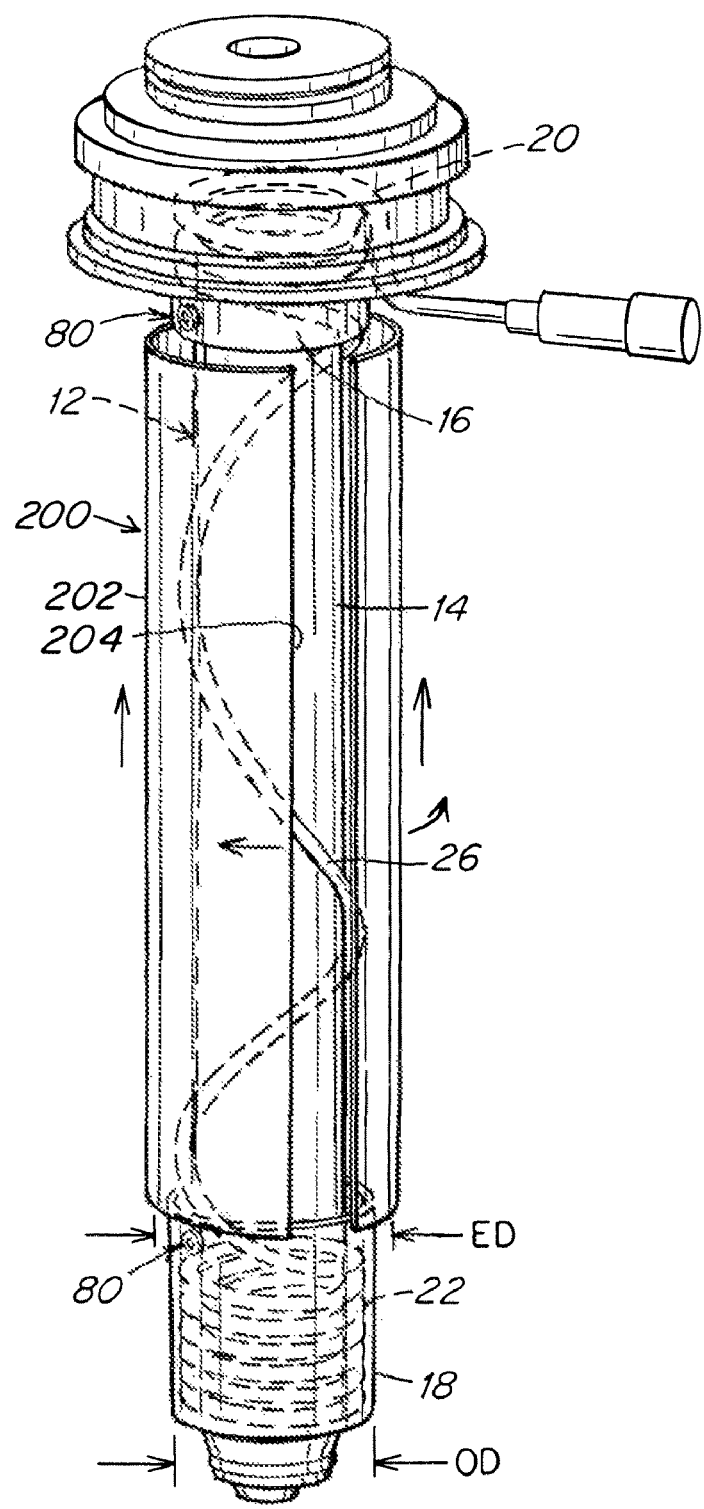
FIG. 24 shows the next step in the sequence of installation steps of the FIG. 20 apparatus subsequent to the FIG. 23 step showing the middle tubular mount or collar 200 having been forcibly expanded in cross-sectional diameter along the slit 204 so as to be slidable over and around the outside diameter of downstream mount 18 and axially slid in an upstream direction until it is disposed in the position shown between the upstream mount 16 and downstream 18 mounts.

In another alternative embodiment shown in FIGS. 20-28, the heater apparatus comprises three (3) collars 16, 18, 200. The upstream and downstream 16, 18 collars are configured and function as described above with reference to the FIGS. 11-15 embodiments. The middle collar 200 is configured to have a relatively extended axial length A10 on that it preferably encompasses at least about 75% and preferably at least about 90% of the extended axial length A6, FIG. 23, of the middle section 26 of the heater tube 24 after installation. FIG. 21 shows the apparatus in its non-extended state. As shown the middle collar 200 has a slit or slot 204 that extends through the wall 202 along the entire axial length A10 of the collar 200. The body 202 of the collar is configured as a hollow tube having a selected inner diameter RD in its relaxed state, FIG. 21. The inner diameter RD of the tube 200 in its relaxed state, FIG. 21, is typically configured or adapted to be slightly less than the outside circumferential diameter OTD of the middle section 26 of the tubular heater 24 in its expanded state, FIG. 23 (typically about 0.001 to about 0.2 inches less) on that when the collar 200 is installed over and around the middle section, the inside surface of the tubular body 202 engages against and contacts the outside circumferential surface of the middle section 26 under compression of inherent spring force SF in body 202. The inherent spring force in body 202 enables the tubular body 202 to be reversibly expanded in diameter by manual force to at least an expanded or larger diameter ED, FIG. 24, that is the same as or slightly greater than the outside diameter OD of the downstream 18 (or other collar) (typically 0.001 to about 0.3 inches greater) so that the collar 200 can be readily slid axially over the outside surface of the downstream collar 18 without permanently deforming the tubular configuration of the tube 200. As shown in the assembly sequence of FIGS. 21-25, the subassembly of collars 16, 18 and tubing 24 start out in a relaxed state with the middle section 26 having a non-extended axis length A5. This non-extended assembly is first installed, FIG. 22, around the outside surface 14 of the channel body 12 with the upstream collar 16 next being affixed to the body 12 by appropriate turning T of screw 82 and locking of the collar 16 in fixed position. Next, FIG. 23, the downstream collar 18 is separated or pulled axially away downstream from the fixed upstream collar 16 extending the middle section 26 axially to an axial length of A6. The downstream collar 18 is then affixed to the body 12 with the middle section 26 having its extended axis A6. As discussed above with reference to FIGS. 11, 12, the two collars 16, 18 may be rotated relative to each other prior to affixation of collar 18 to body 12. Next the middle collar 200 is manually expanded in a radial direction against inherent spring force SF to a diameter of ED and slid axially over the outside circumferential surface of one of the collars (as shown in FIG. 24 over collar 18) into a position such that the axial length A10 of the collar 200 is axially aligned with the extended axial length A6 of middle heater section 26. Next, once the collar 200 is so positioned, the manual expansion force is discontinued and the collar body 202 is allowed to spring back under force SF to a more relaxed reduced diameter position where the inside surface of the tubular collar 200 is either in compressed engagement or contact with or in close physical adjacency to the outside circumferential surface of the middle heater tube section 26, the tube section 26 being better physically secured by the collar 200 against expansion in a radial direction away from contact or thermal communication with the body 12 of the flow channel.

Figure 25:
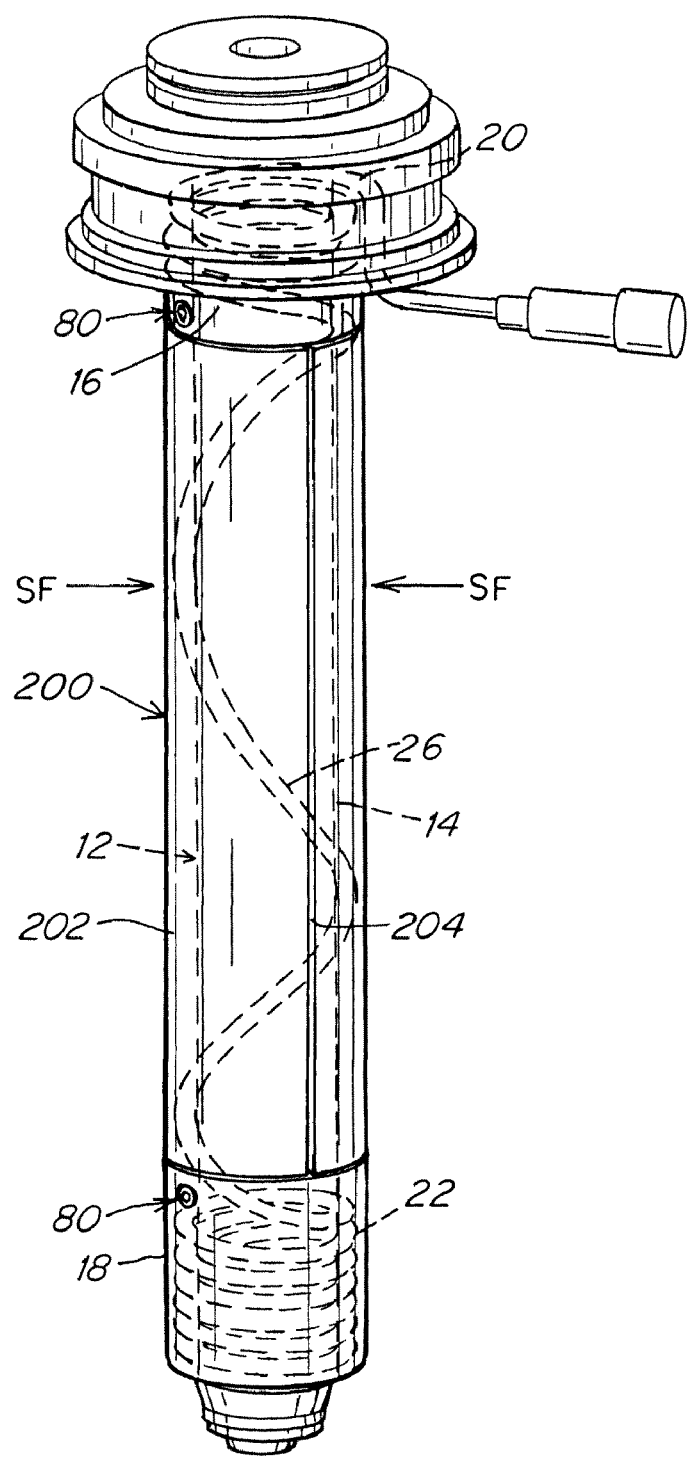
FIG. 25 shows the next step in the sequence of installation steps of the FIG. 20 apparatus subsequent to the FIG. 24 step showing the middle tubular mount or collar 200 having snapped back from its diametrically expanded state to its original non-expanded state such that the interior surface of the middle mount 200 is positioned around the axial length of the outside surface of the middle portion 26 of the coiled heater, the mount or collar 200 being adapted to have a size, configuration and inherent spring force relative to the outside diameter of the middle coil 26 such that the interior surface of the middle mount 200 engages against and contacts the outside surface of the middle coil 26 preferably under compression.
Figure 26:
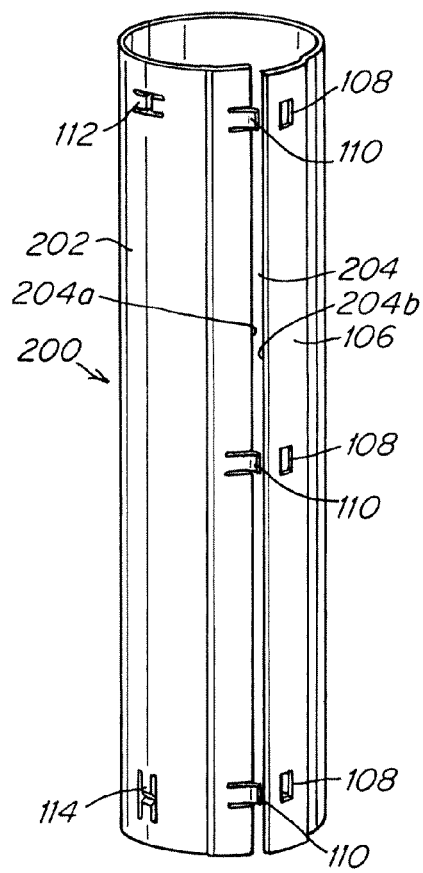
FIGS. 26-28 show an alternative embodiment of the three (3) mount or collar 20, 22, 200 embodiment of FIGS. 21-25 where the middle collar 200 has locking mechanism that locks the cross-sectional circumference of the mount into a fixed circumferential position once the tubular mount is slid into position between the upstream and downstream mounts.
Figure 27:
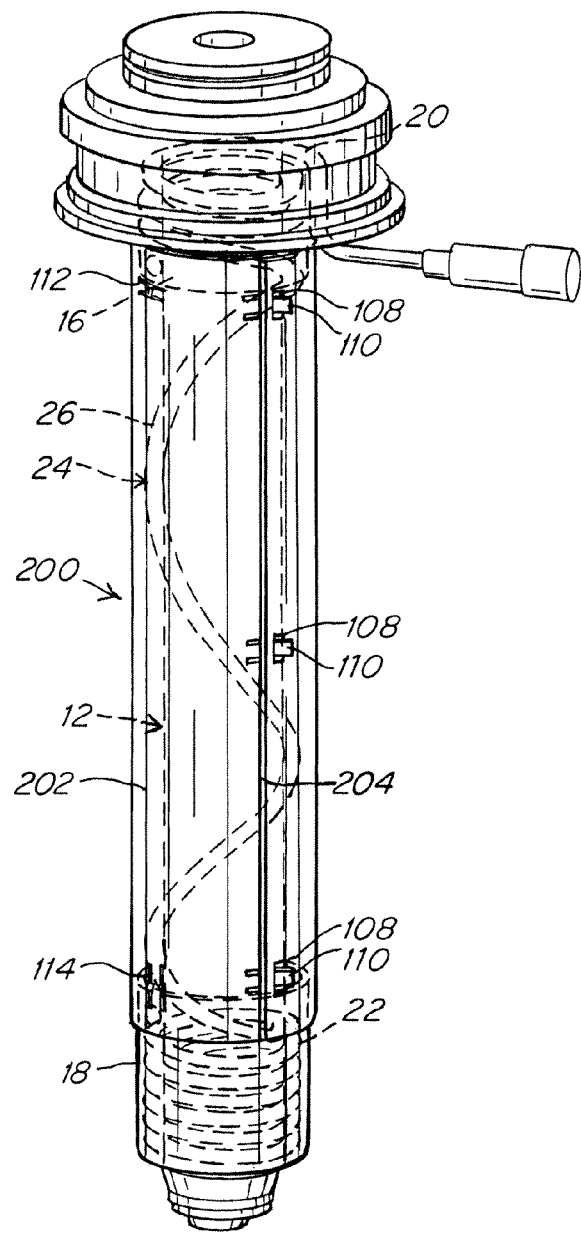
Figure 28:
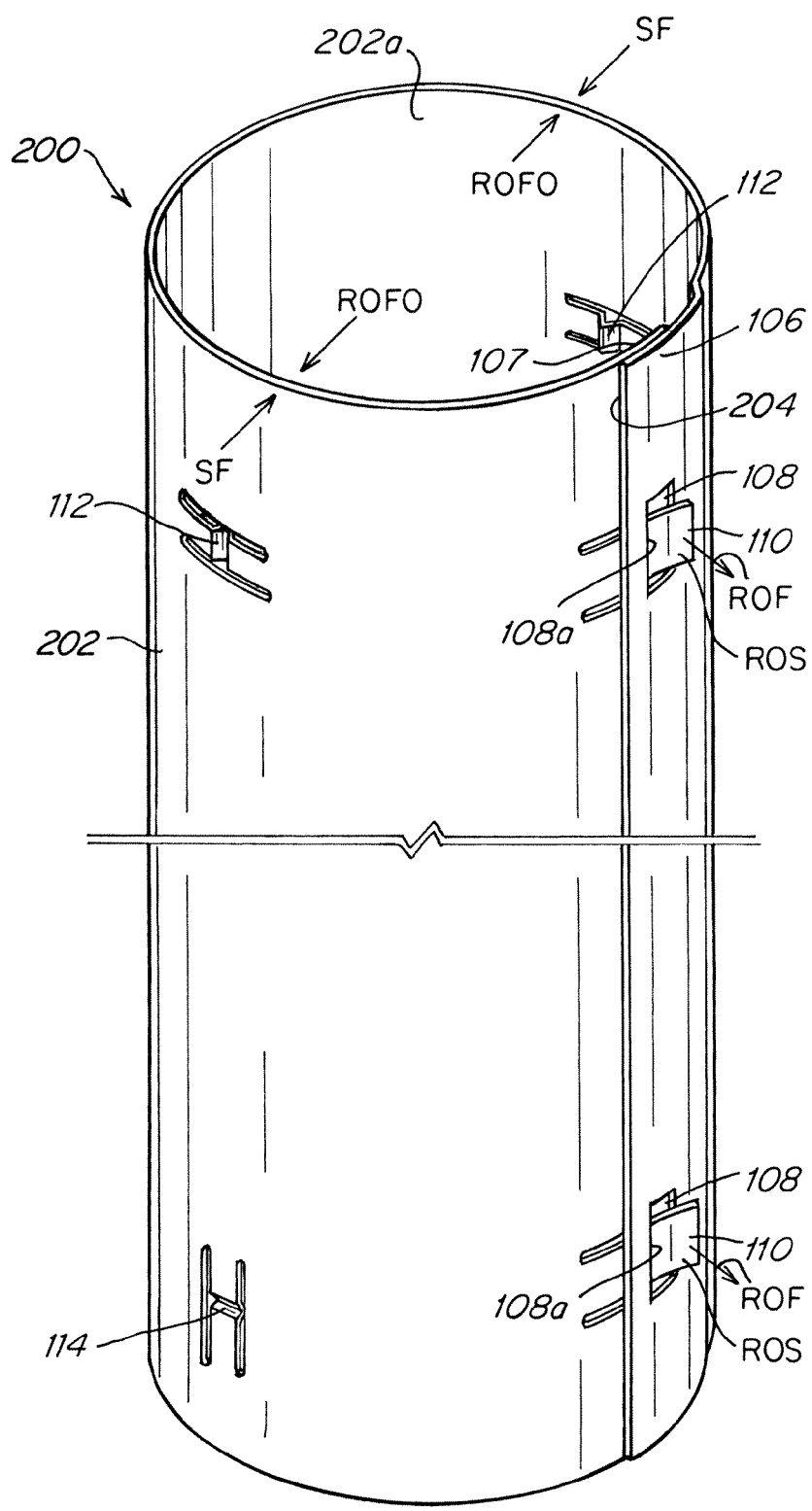
Figure 29:
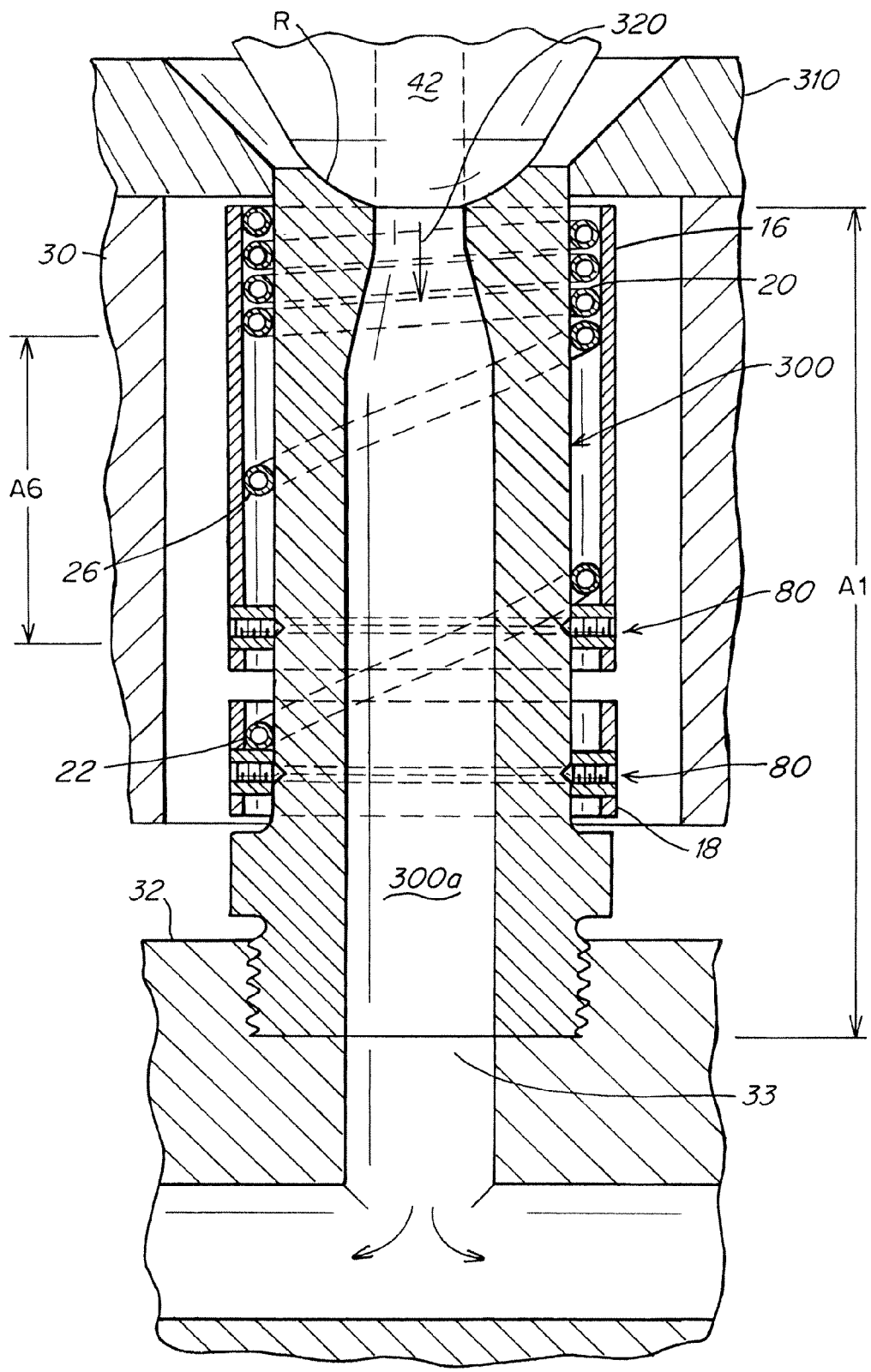
FIG. 29 shows an embodiment of the invention where a heater assembly is mounted on and around an inlet tube that connects the upstream fluid output port of an injection molding machine to the downstream fluid input port of a hotrunner distribution manifold in an injection molding system.

In the embodiment of FIGS. 26-28, the collar 200 has spring loaded tabs 110 attached to one edge 204a of the slit or slot 204 and complementary receiving apertures 108 formed in the other edge 204b of the slot 204 that receive the tabs 110 when the spring force SF or other manually applied force (not shown) is applied or allowed to act to close the slot 204. As shown in FIG. 28 the tabs are adapted to project radially outwardly in the direction of their inherent radially outward force ROF from the center axis of the tube 200 such that the tabs 110 extend radially outwardly through the receiving apertures 108. The radially outer surfaces ROS of the tabs 110 remain engaged against the distal edges 108a of the receiving apertures 108 under the spring force ROF. The engagement of the surfaces ROS against the aperture edges 108a under the spring force ROS act as a lock to hold the opposing terminal ends 106, 107 of the slotted tube 200 together in overlapped relationship. Such a locking mechanism 108, 108a, 110, ROS, FIG. 28, acts against any opposing radially outward forces ROFO that can or might occur on the tubular body 202 to cause the opposing ends 106, 107 to separate from each other as a result of the inner surface 202a of the tube engaging under compression against the outer circumferential surfaces of the axially extended middle section 26 of the tubular coiled heater 24 when the middle collar 200 is mounted in an axial position that is aligned along and with the axial length A6 of the middle section 26 as shown in FIGS. 27, 25, 20. As with the FIGS. 21-25 embodiment, the collar 200 of the FIGS. 26-28 embodiment can have a relaxed state inside diameter RD that is slightly less than the outside diameter OTD of the middle heater tube section 26 thus causing the inner circumferential surface 202a to engage and remain in contact under pressure SF with the outside circumferential surface of the middle tube section 26, the locking mechanism 108, 108a, 110, ROF acting to maintain the ends 106, 107 closed as well as maintain the inner surface 202a in constant compressed contact with the outer surface of the middle section 26. The maintenance of such compressed contact serves to maximize heat transfer from the walls of the coiled tubular section 26 to the flow channel body 12.

The collar 200 in the FIGS. 20-28 embodiment may alternatively be configured or adapted to have a relaxed state inside diameter RD that is the same or greater than the diameter OTD by between about 0.001 and about 0.02 inches.

Figure 30:
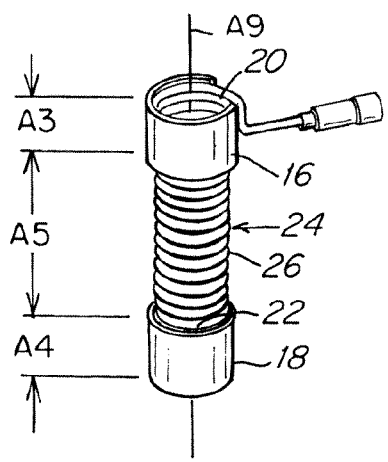
FIGS. 30, 31 show an embodiment of a heater apparatus according to the invention where the middle coiled section 26 of the heater coil 24 comprises a relatively high number of coils which enables the middle section 26 of the apparatus to be extended a relatively long distance A6 such as from about 2 to about 30 inches along the axis A9 of the apparatus.
Figure 31:
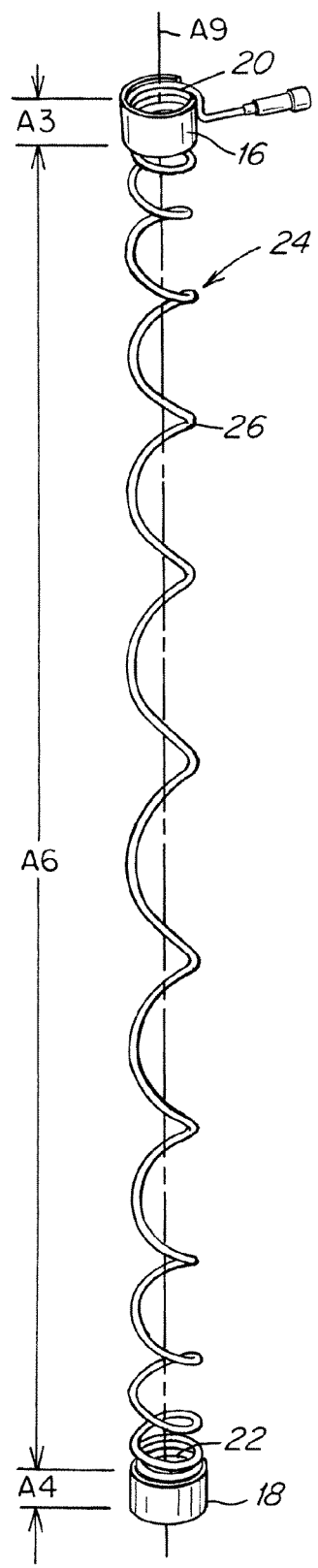

FIGS. 30, 31 show an embodiment where the middle section 26 comprises multiple coils (more than 3 coils) as opposed to the previous embodiments where the middle section 26 comprises only a few coils. The use of multiple coils in the middle section 26, FIGS. 30, 31, enables the apparatus to be extended from an initial relaxed state axial length A5, FIG. 30, of as little as about 0.5 inches to an extended axial length A6 of up to about 30 inches, FIG. 31.

Figure 32A:
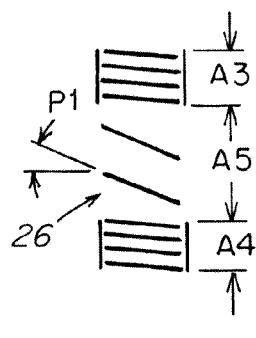
FIGS. 32A-32D are schematics of alternative embodiments of the invention showing the pitch of the coils of the middle section 26 in the initial non-extended state A5 of the alternative apparatuses of FIGS. 32A, 32C and the increased pitch of the middle sections 26 in their extended A6, FIGS. 32B, 32D states.
Figure 32B:
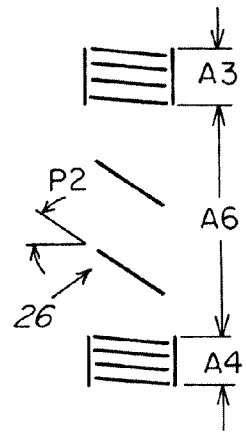
Figure 32C:
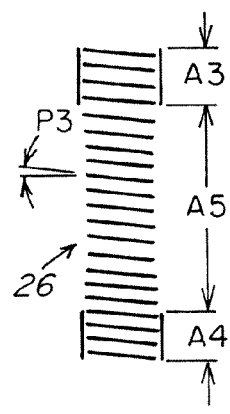
Figure 32D:
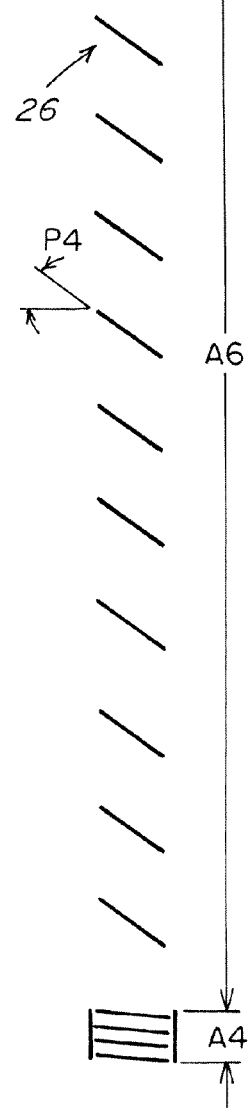

FIGS. 32A, 32B show schematically an embodiment where the difference between the relaxed state axial length A5 and the extended state axial length is between about 0.2 and about 2 inches, the difference in pitch between the pitch P1 of the initial non-extended coils 26 and the pitch P2 of the extended coils being relatively small, typically less than about 15 degrees. By contrast, FIGS. 32C, 32D shows an embodiment where section 26 comprises a large number of coils that can be extended in axial length from its non-extended state, FIG. 32C, to its extended state, FIG. 32D by 0.2 to as much as about 30 inches, the difference between the pitch P3 of the non-extended coils 26 and the pitch P4 of the extended coils 26 ranging up to as much as about 45 degrees.

Figure 33:
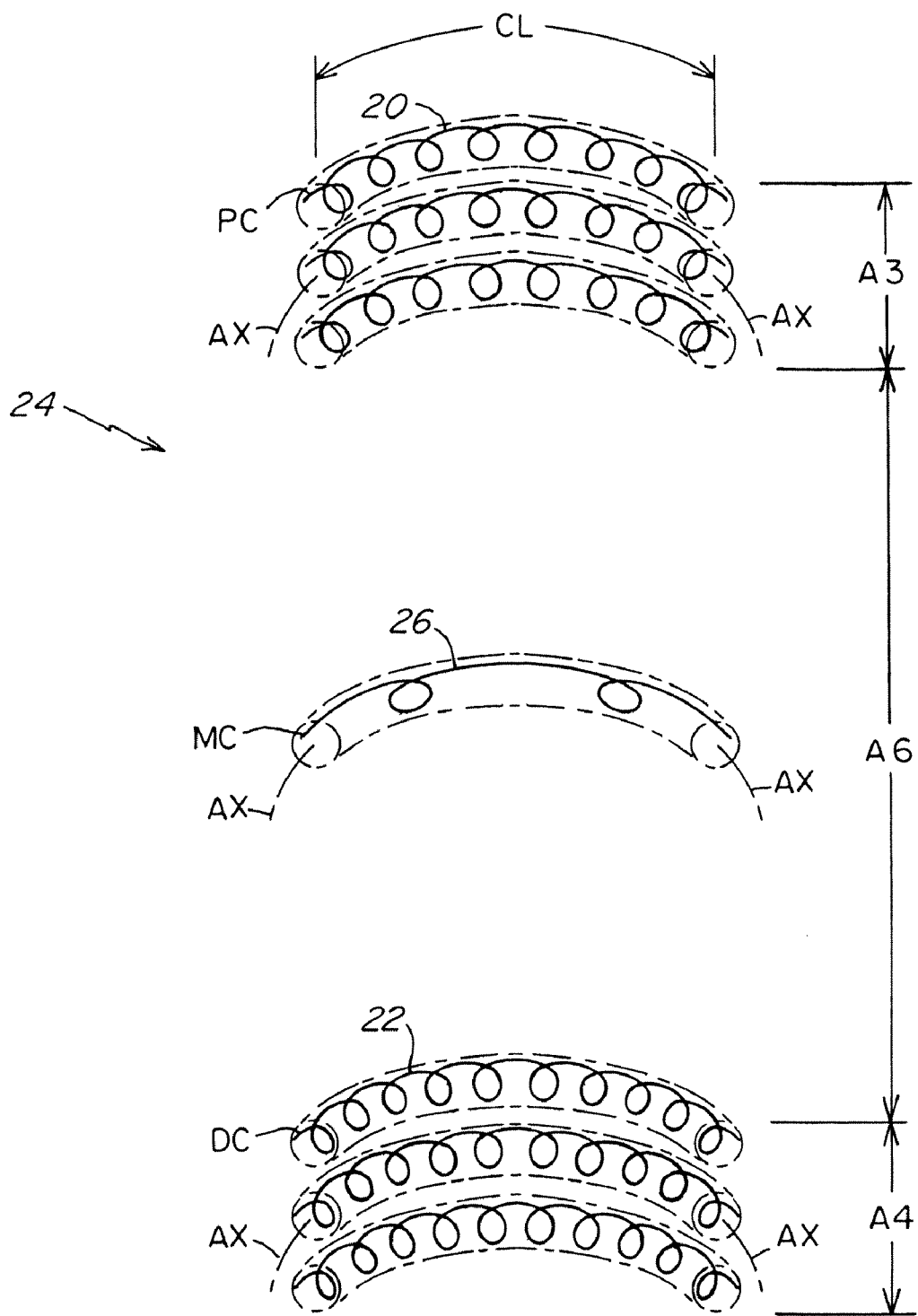
FIG. 33 is a schematic cross-section of an embodiment of the invention showing a cylindrical wire that acts as the heat generating element of the apparatus being disposed throughout the interior bore of the hollow tubular coiled sections 20, 200 and 22 and being coiled to selected different degrees per axial length CL of tubing 24 along the axial lengths A3, A6, A4 of the upstream 20, middle 26 and downstream 22 sections of the heater tubing 24.

FIG. 33 shows an embodiment where the heat output per any given longitudinal axial length CL along the longitudinal axis AX of heater 24 tubing and specifically along the longitudinal axial lengths of any of tubing sections 20, 26, 22, can be selectively varied by increasing or decreasing the amount or length of heater wire within any given axial length of heater tube 24 tubing. As shown, for essentially the same longitudinal axial length CL along the longitudinal axis AX of heater tubing, section 20 has eight coils of heater wire PC, section 26 has two coils of heater wire MC, and section 22 has ten coils of heater wire DC. The more coils of heat generating wire per axial length of tubing 24, the greater the heat output per length of tubing 24. Thus, more or fewer numbers of coils of tubing 20, 26 or 22, may be employed in the design of the heater assembly depending of the choice of the number/degree of heater wire PC, MC, DC coiling that is selected per axial length of tubing 20, 26, 22. As can be readily imagined the size, shape and physical design of a heater assembly comprised of multiple coils that make up sections 20, 26, 22 and two or three collars, 16, 200, 18 can be widely varied where the degree of heat generation per length of tubing 24 is variable between different sections and axial lengths of tubing 24.

As can be readily imagined, the axial length of the coiled end portions 20, 22 and the number of tubing coils comprising sections 20, 26 and 22 is variably selectable to enable the user to variably select the degree of heat output in each such section and concomitantly the degree of heat transfer to the upstream, middle and downstream sections along the axial length A1 of the flow channel surrounded and in thermal communication with tubing sections 20, 26, 22.

What is claimed is:

1. An apparatus for heating a fluid being injected in an injection molding system, the apparatus comprising:
   a mold having a cavity,
   a fluid flow distribution manifold,
   a fluid flow channel body surrounding a fluid flow channel having a flow path axis, the fluid flow channel communicating with the cavity of the mold to deliver fluid thereto;
   a coiled tube comprised of a thermally conductive wall, the wall formed into an elongated coil having a coil axis, the wall of the coiled tube housing a hollow interior bore extending from an upstream end to a downstream end of the coiled tube;
   a heater disposed within the hollow interior bore in thermally conductive communication with an interior surface of the wall, the heater being controllably heatable to selectable elevated temperatures;
   the coiled tube being mounted in thermally conductive communication with the fluid flow channel body around the fluid flow axis of the flow channel;
   the coiled tube having an upstream coiled portion, a downstream coiled portion and an intermediate coiled portion connecting the upstream and downstream coiled portions;
   one of the upstream and downstream coiled portions of the coiled tube being fixable to the channel body, the other of the upstream or downstream coiled portions being selectively movable away from the one coiled portion when fixed to the channel body along the coil axis over a selected range of axial distance to cause the intermediate coiled portion of the coiled tube to stretch or extend in coil axial length on axial movement of the upstream and downstream coiled portions away from each other over the selected range of axial distance.

2. The apparatus of claim 1 wherein the upstream and downstream coiled portions of the coiled tube are adapted to resist stretching on being separated over the selected range of axial distance.

3. The apparatus of claim 1 wherein the upstream and downstream coiled portions are readily attachable to and detachable from a surface of the fluid flow channel body surrounding the fluid flow subsequent to the intermediate coiled portion being extended, the intermediate coiled portion being slidably mounted around the surface surrounding the axis of the fluid flow channel and in thermally conductive communication therewith.

4. The apparatus of claim 1 wherein the upstream and downstream coiled portions are attached to upstream and downstream tubular collars respectively, the tubular collars being readily attachable to and detachable from upstream and downstream portions of the fluid flow channel body or a thermally conductive body in contact therewith such that the upstream and downstream coiled portions are fixed in thermally conductive communication with the fluid flow channel body.

5. The apparatus of claim 1 wherein the upstream and downstream coiled portions are mountable around the fluid flow channel axis such that the upstream and downstream coiled portions are rotatable relative to each other around the fluid flow channel axis.

6. The apparatus of claim 4 wherein the tubular collars are rotatable relative to each other to a selected degree around the fluid flow channel axis in a direction that causes the intermediate coiled portion to increase or decrease in cross-sectional diameter to a selected degree that is dependent on the selected degree of rotation of the tubular collars.

7. The apparatus of claim 6 wherein the tubular collars are rotated relative to each other around the fluid flow axis to such a degree as to cause the intermediate coiled portion to engage against the fluid flow channel body under compression when the tubular collars are attached to the fluid flow channel body.

8. The apparatus of claim 4 wherein one or the other or both of the upstream and downstream coiled portions are connected to and arranged on a radially interior surface of a respective upstream or downstream tubular collar such that the wall of the upstream or downstream coiled portion is in direct contact with or immediate spatial adjacency to an outside surface of the fluid flow channel body or a thermally conductive body in contact with the fluid flow channel body when the tubular collars are attached to the fluid flow channel body or a thermally conductive body in contact therewith.

9. The apparatus of claim 4 wherein a selected one of the upstream or downstream tubular collars are adapted to extend in axial length a selected distance such that the intermediate coiled portion is circumferentially surrounded along a selected portion of its coil axis by the selected one of the tubular collars.

10. The apparatus of claim 9 wherein the axial length of the selected one of the tubular collars is selected so that the selected one of the tubular collars surrounds the intermediate portion of the coiled tube along at least about 60% of the coil axis length of the intermediate coiled portion after the intermediate coiled portion has been stretched.

11. The apparatus of claim 1 wherein the maximum axial distance to which the intermediate portion can be stretched is at least about 30 inches.

12. The apparatus of claim 1 wherein the number of coils per length of coil axis of the upstream, downstream and intermediate coiled portions of the coiled tube is selectively variable.

13. The apparatus of claim 1 wherein the degree of heat energy output of the upstream, downstream and intermediate coiled portions is dependent on the number of coils per coil axis length of each section.

14. The apparatus of claim 3 wherein the upstream and downstream coiled portions are rotatable relative to each other to a selected degree around the fluid flow channel axis in a direction that causes the intermediate coiled portion to increase or decrease in cross-sectional diameter to a selected degree that is dependent on the selected degree of rotation of the upstream and downstream portions.

15. The apparatus of claim 14 wherein the upstream and downstream portions are rotated relative to each other around the fluid flow axis to such a degree as to cause the intermediate coiled portion to engage against the fluid flow channel body under compression when the upstream and downstream portions are attached to the fluid flow channel body.

16. An apparatus for heating a fluid material in an injection molding system, the apparatus comprising:
- a fluid flow channel body having a flow channel that communicates fluid flow to a cavity of a mold mounted in the injection molding system;
- a coiled tube comprised of a thermally conductive wall, the wall formed into an elongated coil having a coil axis, the wall of the coiled tube housing a hollow interior bore extending from an upstream end to a downstream end of the coiled tube;
- a heater disposed in the hollow interior bore in thermally conductive communication with an interior surface of the wall, the heater being controllably heatable to selectable elevated temperatures;
- the coiled tube being mounted in thermally conductive communication with the fluid flow channel body around the fluid flow channel;
- the coiled tube having an upstream coiled portion, a downstream coiled portion and an intermediate coiled portion connecting the upstream and downstream coiled portions;
- the upstream and downstream coiled portions of the coiled tube being selectively movable away from each other over a selected range of axial distance along the coil axis;
- wherein the upstream, downstream and intermediate coiled portions of the coiled tube each have a selected coil axial length and have a selected number of coils per their respective coil axial lengths, the upstream and downstream coiled portions of the coiled tube being selectively movable away from each other along the coil axis to cause the number of coils per coil axial length of the intermediate coiled portion to be reduced and the number of coils per coil axial length of the upstream and downstream coiled portions remaining the same upon movement of the upstream and downstream coiled portions away from each other.

17. Apparatus for heating a fluid material in an injection molding system, the apparatus comprising:
- a fluid flow channel body having a flow channel communicating fluid flow to a cavity of a mold;
- a coiled tube comprised of a thermally conductive wall, the wall formed into an elongated coil having a coil axis, the wall of the coiled tube housing a hollow interior bore extending from an upstream end to a downstream end of the coiled tube;
- a heater disposed in the hollow interior passage in thermally conductive communication with an interior surface of the wall, the heater being controllably heatable to selectable elevated temperatures;
- the coiled tube being mounted in thermally conductive communication with the fluid flow channel body;
- the coiled tube having an upstream coiled portion, a downstream coiled portion and an intermediate coiled portion connecting the upstream and downstream coiled portions;
- the upstream and downstream coiled portions of the coiled tube being selectively movable away from each other along the coil axis over a selected range of axial distance;
- wherein the upstream, downstream and intermediate coiled portions each have a selected radial diameter prior to movement of the upstream and downstream coiled portions away from each other, the upstream and downstream coiled portions having the same or substantially the same radial diameter and the intermediate coiled portion having a smaller radial diameter subsequent to movement of the upstream and downstream coiled portions away from each other over the selected axial distance.

* * * * *

UNITED STATES PATENT AND TRADEMARK OFFICE
CERTIFICATE OF CORRECTION

PATENT NO. : 8,328,549 B2
APPLICATION NO. : 12/980979
DATED : December 11, 2012
INVENTOR(S) : Galati et al.

It is certified that error appears in the above-identified patent and that said Letters Patent is hereby corrected as shown below:

Please amend the following:

Col. 20, line 33, claim 17:

change "passage" to -- bore --

Signed and Sealed this
Twelfth Day of February, 2013

Teresa Stanek Rea
*Acting Director of the United States Patent and Trademark Office*